(12) United States Patent
Merrill et al.

(10) Patent No.: US 11,960,981 B2
(45) Date of Patent: Apr. 16, 2024

(54) SYSTEMS AND METHODS FOR PROVIDING MACHINE LEARNING MODEL EVALUATION BY USING DECOMPOSITION

(71) Applicant: ZestFinance, Inc., Los Angeles, CA (US)

(72) Inventors: Douglas C. Merrill, Los Angeles, CA (US); Michael Edward Ruberry, Los Angeles, CA (US); Ozan Sayin, Los Angeles, CA (US); Bojan Tunguz, Greencastle, IN (US); Lin Song, Sugarland, TX (US); Esfandiar Alizadeh, Venice, CA (US); Melanie Eunique DeBruin, Northridege, CA (US); Yachen Yan, Los Angeles, CA (US); Derek Wilcox, Los Angeles, CA (US); John Candido, Burbank, CA (US); Benjamin Anthony Solecki, Los Angeles, CA (US); Jiahuan He, Los Angeles, CA (US); Jerome Louis Budzik, Altadena, CA (US); Armen Avedis Donigian, Los Angeles, CA (US); Eran Dvir, Valley Village, CA (US); Sean Javad Kamkar, Los Angeles, CA (US); Vishwaesh Rajiv, Los Angeles, CA (US); Evan George Kriminger, Los Angeles, CA (US)

(73) Assignee: ZESTFINANCE, INC., Burbank, CA (US)

( * ) Notice: Subject to any disclaimer, the term of this patent is extended or adjusted under 35 U.S.C. 154(b) by 1357 days.

(21) Appl. No.: 16/297,099

(22) Filed: Mar. 8, 2019

(65) Prior Publication Data
US 2019/0279111 A1 Sep. 12, 2019

Related U.S. Application Data

(60) Provisional application No. 62/641,176, filed on Mar. 9, 2018.

(51) Int. Cl.
*G06N 20/20* (2019.01)
*B60Q 9/00* (2006.01)
*G06N 5/01* (2023.01)

(52) U.S. Cl.
CPC .............. *G06N 20/20* (2019.01); *B60Q 9/00* (2013.01); *G06N 5/01* (2023.01)

(58) Field of Classification Search
USPC ......................................................... 706/25
See application file for complete search history.

(56) References Cited

U.S. PATENT DOCUMENTS

| | | |
|---|---|---|
| 525,413 A | 9/1894 | Gates |
| 5,745,654 A | 4/1998 | Titan |

(Continued)

FOREIGN PATENT DOCUMENTS

| | | | | |
|---|---|---|---|---|
| CN | 108133418 A | * | 6/2018 | ............. G06N 20/00 |
| WO | 2014014047 A1 | | 1/2014 | |

(Continued)

OTHER PUBLICATIONS

Abseher, Michael, Nysret Musliu, and Stefan Woltran. "Improving the efficiency of dynamic programming on tree decompositions via machine learning." Journal of Artificial Intelligence Research 58 (2017): 829-858. (Year: 2017).*

(Continued)

*Primary Examiner* — Michael Young
(74) *Attorney, Agent, or Firm* — TROUTMAN PEPPER HAMILTON SANDERS LLP; Christopher J. Forstner; Nicholas J. Gallo

(57) ABSTRACT

Systems and methods for model evaluation. A model is evaluated by performing a decomposition process for a model output, relative to a baseline input data set.

21 Claims, 7 Drawing Sheets

(56) References Cited

U.S. PATENT DOCUMENTS

| | | |
|---|---|---|
| 5,999,938 A | 12/1999 | Bliss et al. |
| 6,034,314 A | 3/2000 | Koike |
| 6,877,656 B1 | 4/2005 | Jaros et al. |
| 7,035,811 B2 | 4/2006 | Gorenstein |
| 7,280,980 B1 | 10/2007 | Hoadley et al. |
| 7,467,116 B2 | 12/2008 | Wang |
| 7,499,919 B2 | 3/2009 | Meyerzon et al. |
| 7,542,993 B2 | 6/2009 | Satterfield et al. |
| 7,610,257 B1 | 10/2009 | Abrahams |
| 7,711,635 B2 | 5/2010 | Steele et al. |
| 7,765,151 B1 | 7/2010 | Williams et al. |
| 7,813,945 B2 | 10/2010 | Bonissone et al. |
| 7,873,535 B2 | 1/2011 | Umblijs et al. |
| 7,873,570 B2 | 1/2011 | Cagan et al. |
| 7,921,359 B2 | 4/2011 | Friebel |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,280,805 B1 | 10/2012 | Abrahams |
| 8,335,741 B2 | 12/2012 | Kornegay et al. |
| 8,442,886 B1 | 5/2013 | Haggerty et al. |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Lau et al. |
| 8,600,966 B2 | 12/2013 | Kravcik |
| 8,626,645 B1 | 1/2014 | Lazerson |
| 8,645,417 B2 | 2/2014 | Groeneveld et al. |
| 8,660,943 B1 | 2/2014 | Chirehdast |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,501,749 B1 | 11/2016 | Narsky |
| 9,639,805 B1 | 5/2017 | Feller |
| 9,686,863 B2 | 6/2017 | Chung et al. |
| 10,121,115 B2 | 11/2018 | Chrapko |
| 10,581,887 B1 | 3/2020 | Dinerstein |
| 10,684,598 B1 | 6/2020 | Alanqar |
| 10,719,301 B1 | 7/2020 | Dasgupta |
| 10,824,959 B1 | 11/2020 | Chatterjee |
| 10,977,558 B2 | 4/2021 | Herbster |
| 11,296,971 B1 | 4/2022 | Jain |
| 2002/0038277 A1 | 3/2002 | Yuan |
| 2002/0091650 A1 | 7/2002 | Ellis |
| 2002/0138414 A1 | 9/2002 | Baker |
| 2002/0178113 A1 | 11/2002 | Clifford et al. |
| 2003/0009369 A1 | 1/2003 | Gorenstein |
| 2003/0033242 A1 | 2/2003 | Lynch et al. |
| 2003/0033587 A1 | 2/2003 | Ferguson |
| 2003/0046223 A1 | 3/2003 | Crawford et al. |
| 2003/0101080 A1 | 5/2003 | Zizzamia et al. |
| 2003/0147558 A1 | 8/2003 | Loui et al. |
| 2003/0176931 A1 | 9/2003 | Pednault |
| 2004/0068509 A1 | 4/2004 | Garden et al. |
| 2004/0107161 A1 | 6/2004 | Tanaka et al. |
| 2004/0199456 A1 | 10/2004 | Flint et al. |
| 2005/0055296 A1 | 3/2005 | Hattersley et al. |
| 2005/0114279 A1 | 5/2005 | Scarborough et al. |
| 2005/0234762 A1 | 10/2005 | Pinto |
| 2005/0278246 A1 | 12/2005 | Friedman et al. |
| 2006/0047613 A1 | 3/2006 | Labreuche |
| 2006/0083214 A1 | 4/2006 | Grim, III |
| 2006/0106570 A1 | 5/2006 | Feldman |
| 2006/0112039 A1 | 5/2006 | Wang |
| 2006/0167654 A1 | 7/2006 | Keinan et al. |
| 2006/0200396 A1 | 9/2006 | Satterfield et al. |
| 2006/0218067 A1 | 9/2006 | Steele |
| 2007/0005313 A1 | 1/2007 | Sevastyanov |
| 2007/0011175 A1 | 1/2007 | Langseth |
| 2007/0016542 A1 | 1/2007 | Rosauer et al. |
| 2007/0050286 A1 | 3/2007 | Abrahams |
| 2007/0055619 A1 | 3/2007 | Abrahams et al. |
| 2007/0067284 A1 | 3/2007 | Meyerzon et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2007/0288338 A1 | 12/2007 | Hoadley et al. |
| 2008/0133402 A1 | 6/2008 | Kurian et al. |
| 2008/0208820 A1 | 8/2008 | Usey et al. |
| 2008/0222061 A1 | 9/2008 | Soetjahja |
| 2008/0306893 A1 | 12/2008 | Saidi |
| 2008/0307006 A1 | 12/2008 | Lee |
| 2009/0006283 A1 | 1/2009 | Labrie et al. |
| 2009/0006356 A1 | 1/2009 | Liao et al. |
| 2009/0015433 A1 | 1/2009 | James |
| 2009/0024517 A1 | 1/2009 | Crooks |
| 2009/0030888 A1 | 1/2009 | Sahu et al. |
| 2009/0037308 A1 | 2/2009 | Feinstein |
| 2009/0192980 A1 | 7/2009 | Beyer et al. |
| 2009/0216748 A1 | 8/2009 | Kravcik |
| 2009/0254572 A1 | 10/2009 | Redlich |
| 2009/0299911 A1 | 12/2009 | Abrahams |
| 2009/0319521 A1 | 12/2009 | Groeneveld et al. |
| 2010/0005018 A1 | 1/2010 | Tidwell |
| 2010/0010878 A1 | 1/2010 | Pinto et al. |
| 2010/0010935 A1 | 1/2010 | Shelton |
| 2010/0082476 A1 | 4/2010 | Bowman |
| 2010/0257459 A1 | 10/2010 | Galbreath et al. |
| 2010/0325067 A1 | 12/2010 | Cagan et al. |
| 2011/0071969 A1 | 3/2011 | Doctor et al. |
| 2011/0078073 A1 | 3/2011 | Annappindi |
| 2011/0112957 A1 | 5/2011 | Ingram et al. |
| 2011/0161263 A1 | 6/2011 | Lee |
| 2011/0173116 A1 | 7/2011 | Yan |
| 2011/0178902 A1 | 7/2011 | Imrey |
| 2011/0184941 A1 | 7/2011 | El-Charif et al. |
| 2011/0320423 A1 | 12/2011 | Gemmell et al. |
| 2012/0053951 A1 | 3/2012 | Kowalchuk et al. |
| 2012/0059819 A1 | 3/2012 | Wheeler et al. |
| 2012/0066106 A1 | 3/2012 | Papadimitriou |
| 2012/0066116 A1 | 3/2012 | Kornegay et al. |
| 2012/0072029 A1 | 3/2012 | Persaud et al. |
| 2012/0082476 A1 | 4/2012 | Ito et al. |
| 2012/0239613 A1 | 9/2012 | Danciu |
| 2013/0091050 A1 | 4/2013 | Merrill |
| 2013/0103569 A1 | 4/2013 | Gopinathan |
| 2013/0138553 A1 | 5/2013 | Nikankin et al. |
| 2013/0185189 A1 | 7/2013 | Stewart |
| 2014/0012794 A1 | 1/2014 | Dillon et al. |
| 2014/0014047 A1 | 1/2014 | Garcia et al. |
| 2014/0025872 A1 | 1/2014 | Flynn |
| 2014/0052604 A9 | 2/2014 | Stewart |
| 2014/0081832 A1 | 3/2014 | Merrill et al. |
| 2014/0108665 A1 | 4/2014 | Arora |
| 2014/0122355 A1 | 5/2014 | Hardtke et al. |
| 2014/0149177 A1 | 5/2014 | Frank et al. |
| 2014/0172886 A1 | 6/2014 | Wilkes et al. |
| 2014/0180790 A1 | 6/2014 | Boal |
| 2014/0181267 A1 | 6/2014 | Wadkins |
| 2014/0310661 A1 | 10/2014 | Frederickson |
| 2014/0310681 A1 | 10/2014 | Poozhiyil |
| 2015/0019912 A1 | 1/2015 | Darling et al. |
| 2015/0056229 A1 | 2/2015 | Nandy et al. |
| 2015/0081602 A1 | 3/2015 | Talley et al. |
| 2015/0161098 A1 | 6/2015 | Granshaw |
| 2015/0213361 A1 | 7/2015 | Gamon |
| 2015/0317337 A1 | 11/2015 | Edgar |
| 2015/0347485 A1 | 12/2015 | Cai |
| 2015/0379428 A1 | 12/2015 | Dirac et al. |
| 2016/0042292 A1 | 2/2016 | Caplan |
| 2016/0088723 A1 | 3/2016 | Chung et al. |
| 2016/0110353 A1 | 4/2016 | Merrill et al. |
| 2016/0132787 A1 | 5/2016 | Drevo et al. |
| 2016/0300252 A1 | 10/2016 | Frank |

(56) References Cited

U.S. PATENT DOCUMENTS

| | | |
|---|---|---|
| 2016/0371238 A1 | 12/2016 | Heavenrich |
| 2017/0061326 A1 | 3/2017 | Talathi et al. |
| 2017/0109657 A1 | 4/2017 | Marcu |
| 2017/0124464 A1 | 5/2017 | Crabtree et al. |
| 2017/0140518 A1 | 5/2017 | Liang et al. |
| 2017/0220633 A1 | 8/2017 | Porath |
| 2017/0222960 A1 | 8/2017 | Agarwal et al. |
| 2017/0316311 A1 | 11/2017 | Pilly |
| 2017/0330058 A1 | 11/2017 | Silberman et al. |
| 2018/0018578 A1 | 1/2018 | Yoshizumi |
| 2018/0025273 A1 | 1/2018 | Jordan |
| 2018/0060738 A1 | 3/2018 | Achin |
| 2018/0068219 A1 | 3/2018 | Turner et al. |
| 2018/0253657 A1* | 9/2018 | Zhao ............... G06N 20/00 |
| 2018/0268262 A1 | 9/2018 | Osada |
| 2018/0293712 A1 | 10/2018 | Vogels |
| 2018/0322406 A1 | 11/2018 | Merrill et al. |
| 2018/0349986 A1 | 12/2018 | Fidanza |
| 2019/0042887 A1 | 2/2019 | Nguyen |
| 2019/0043070 A1 | 2/2019 | Merrill et al. |
| 2019/0114704 A1 | 4/2019 | Way |
| 2019/0228006 A1 | 7/2019 | Tormasov |
| 2019/0244122 A1 | 8/2019 | Li |
| 2019/0279111 A1 | 9/2019 | Merrill et al. |
| 2019/0287025 A1 | 9/2019 | Perez |
| 2019/0303404 A1 | 10/2019 | Amer |
| 2019/0311298 A1 | 10/2019 | Kopp |
| 2019/0318202 A1 | 10/2019 | Zhao |
| 2019/0318421 A1 | 10/2019 | Lyonnet |
| 2019/0325514 A1 | 10/2019 | Hong |
| 2019/0340518 A1 | 11/2019 | Merrill |
| 2019/0340526 A1* | 11/2019 | Turner ............... G06N 3/04 |
| 2019/0340684 A1 | 11/2019 | Belanger |
| 2019/0354806 A1 | 11/2019 | Chhabra |
| 2019/0354853 A1 | 11/2019 | Zoldi |
| 2019/0378210 A1 | 12/2019 | Merrill |
| 2020/0005136 A1 | 1/2020 | Spryn |
| 2020/0012917 A1 | 1/2020 | Pham |
| 2020/0082299 A1 | 3/2020 | Vasconcelos |
| 2020/0160177 A1 | 5/2020 | Durand |
| 2020/0175586 A1 | 6/2020 | McKenna |
| 2020/0183047 A1 | 6/2020 | Denli |
| 2020/0231466 A1 | 7/2020 | Lu |
| 2020/0242492 A1 | 7/2020 | Goel |
| 2020/0257927 A1 | 8/2020 | Nomi |
| 2020/0257961 A1 | 8/2020 | Hua |
| 2021/0019603 A1 | 1/2021 | Friedman |
| 2021/0133631 A1 | 5/2021 | Prendki |
| 2021/0168042 A1* | 6/2021 | Mijumbi ............... H04L 41/147 |
| 2021/0209688 A1 | 7/2021 | Krishnamurthy |
| 2021/0224605 A1 | 7/2021 | Zhang |
| 2021/0256392 A1 | 8/2021 | Zhengzhang |
| 2021/0281491 A1 | 9/2021 | Yelahanka Raghuprasad |
| 2021/0406815 A1 | 12/2021 | Mimassi |
| 2022/0019741 A1 | 1/2022 | Roy |
| 2022/0122171 A1 | 4/2022 | Hubard |
| 2022/0188519 A1 | 6/2022 | Briody |
| 2022/0188568 A1 | 6/2022 | Singh |
| 2022/0191332 A1 | 6/2022 | Ahmadi |

FOREIGN PATENT DOCUMENTS

| | | |
|---|---|---|
| WO | 2014055238 A1 | 4/2014 |
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Bean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.

Office Action (Final Rejection) dated Aug. 16, 2022 for U.S. Appl. No. 15/977,105 (pp. 1-17).

Office Action (Non-Final Rejection) dated Aug. 1, 2022 for U.S. Appl. No. 16/052,293 (pp. 1-15).

Office Action (Non-Final Rejection) dated Aug. 26, 2022 for U.S. Appl. No. 16/394,651 (pp. 1-8).

Office Action (Non-Final Rejection) dated Sep. 15, 2022 for U.S. Appl. No. 17/535,511 (pp. 1-11).

Office Action (Non-Final Rejection) dated Sep. 22, 2022 for U.S. Appl. No. 17/223,698 (pp. 1-8).

Zhao, Q., Li, Q. and Wen, J., 2018. Construction and application research of knowledge graph in aviation risk field. In MATEC Web of Conferences (vol. 151, p. 05003). EDP Sciences.

"International Search Report and Written Opinion of the ISA, dated Sep. 16, 2019, for application No. PCT/US19/029148."

"International Search Report and Written Opinion of the ISA, dated Aug. 23, 2019, for application No. PCT/US9/036049."

Abadi, Martin, et al., "TensorFlow: Large-Scale Machine Learning on Heterogeneous Distributed Systems", Preliminary White Paper, Nov. 9, 2015.

Breiman, Leo, et al., "Random Forests", Machine Learning, 45, 5-32, 2001.

Chen, Tianqi, et al., "XGBoost: A Scalable Tree Boosting System", KDD '16, Aug. 13-17, 2016, San Francisco, CA, USA.

Cortes, Corinna, et al., "Support-Vector Networks", AT&T Labs-Research, USA, Journal Machine Learning, vol. 20, Issue 3, Sep. 1995.

Friedman, Jerome H., "Greedy Function Approximation: A Gradient Boosting Machine", IMS 1999 Reitz Lecture, Feb. 24, 1999.

Garcia-Pedradas, Nicolas, et al., "Nonlinear Boosting Projections for Ensemble Contruction", Journal of Machine Learning Research 8 (2007) 1-33.

Geurts, Pierre, et al., "Extremely randomized trees", Springer Science + Business Media, Inc., rec'd Jun. 14, 2005, pub. online Mar. 2, 2006.

Kamkar, Sean Javad, "Mesh Adaption Strategies for Vortex-Dominated Flows", Standard University, Feb. 2011.

Louppe, Gilles, et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.

Lundberg, Scott M., et al., "A Unified Approach to Interpreting Model Predictions", 31st Conference on Neural Information Processing Systems (NIPS 2017), Long Beach, CA, USA, Nov. 25, 2017.

Lundberg, Scott M., et al., "Consistent Individualized Feature Attribution for Tree Ensembles", University of Washington, Mar. 7, 2019.

Merrill, John W. L., et al., "Generalized Integrated Gradients: A practical method for explaining diverse ensembles", Journal of Machine Learning Research Under Review (2019).

Merrill, Douglas C, et al., "Systems and Methods for Decomposition of Non-Differentiable and Differentiable Models", U.S. Appl. No. 16/434,731, filed Jun. 7, 2019.

Merrill, Douglas C, et al., "Systems and Methods for Enriching Modeling Tools and Infrastructure with Semantics", U.S. Appl. No. 16/394,651, filed Apr. 25, 2019.

Modarres, Ceena, et al., "Towards Explainable Deep Learning for Credit Lending: A Case Study", arXiv:1811.06471v2 [cs.LG], Nov. 30, 2018.

Richardson, L. F., "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.

Richardson, L. F., "The deferred approach to the limit", Philosophical Transactions of the Royal Society A. 226 (636-646): 299-349. doi:10.1098/rsta.1927.0008, Oct. 14, 1926.

Rumelhart, David E., et al., "Learning representations by back-propagating errors", Nature vol. 323, Oct. 9, 1986.

(56) References Cited

OTHER PUBLICATIONS

Shapley, L. S., "A Value For n-Person Games", p. 295, The Rand Corporation, Mar. 18, 1952.

Strumbelj, Eric, et al., "An Efficient Explanation of Individual Classifications using Game Theory", Journal of Machine Learning Research 11 (2010) 1-18.

Tonk, Stijn, "Towards fairness in ML with adversarial networks", https://blog.godatadriven.com/fairness-in-ml, Apr. 27, 2019.

Wolpert, David H., "Stacked Generalization", Original contribution: Stacked generalization. Neural Netw., 5(2):241 {259, Feb. 1992.

Office Action (Non-Final Rejection) dated Mar. 2, 2022 for U.S. Appl. No. 16/434,731 (pp. 1-6).

Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129, 10 pages.

European Extended Search Report issued in EP19764112.9, dated Jun. 27, 2022, 11 pages.

European Extended Search Report issued in EP19764112.9, dated Mar. 24, 2022, 14 pages.

Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110, 8 pages (Year: 2019).

Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780, 16 pages.

Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192, 10 pages.

Office Action (Non-Final Rejection) dated May 24, 2022 for U.S. Appl. No. 16/688,789 (pp. 1-17).

Office Action (Non-Final Rejection) dated Jun. 24, 2022 for U.S. Appl. No. 17/385,452 (pp. 1-14).

Wikipedia entry on "Autoencoder". https://en.wikipedia.org/wiki/Autoencoder Downloaded Jun. 15, 2022 (Year: 2022).

Ward, et al., "An exploration of the influence of path choice in game-theoretic attribuution algorithms," Journal of Machine Learning Research Under Review (2020), 21 pages.

"International Search Report and Written Opinion of the ISA, dated Jul. 5, 2019, for application No. PCT/US19/021381."

Dong Yue et al, "Threaded ensembles of autoencoders for stream learning : Neural Networks for Stream Learning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).

European Extended Search Report issued in EP19796824.1, dated Jun. 13, 2022, 9 pages.

International Preliminary Report on Patentability in International Appln. No. PCT/US2019/029148, dated Nov. 19, 2020, 6 pages.

Li, Hongxiang, et al. "A novel method for credit scoring based on feature transformation and ensemble model." PeerJ Computer Science 7 (2021): e579. 19 pages.

Office Action (Final Rejection) dated Dec. 7, 2022 for U.S. Appl. No. 16/688,789 (pp. 1-24).

Office Action (Non-Final Rejection) dated Oct. 28, 2022 for U.S. Appl. No. 17/389,789 (pp. 1-19).

Office Action (Non-Final Rejection) dated Dec. 8, 2022 for U.S. Appl. No. 17/147,025 (pp. 1-20).

Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

"Bit Array", Wikipedia Search, May 5, 2021 at https://en.wikipedia.org/wiki/Bit_array.

"Genetic algorithm", Wikipedia Search, May 5, 2021 at https://en.wikipedia.org/wiki/Gentic_algorithm.

"International Search Report and the Written Opinion, Application No. PCT/US14/014047, dated May 5, 2014."

"Feature Selection" from Wikipedia and obtained in the Wayback machine at URL "https://en.wikipedia.org/wiki/Feature_selection" for Feb. 25, 2021.

"On the Convergence of Generalized Hill Climbing Algorithms" by A.W. Johnson et al. copyright 2002, Elsevier Science B.V., Discrete Applied Mathematics (Year: 2002).

"Feature Selection", Wikipedia and obtained in the Wayback machine at URL http://en.wikipedia.org/wiki/Feature_selection, Sep. 1, 2011.

Bittencourt, H.R. et al., "Feature Selection by Using Classification and Regression Trees (CART)", dated Aug. 23, 2004.

Chen, Jiahao, Fair lending needs explainable models for responsible recommendation Proceedings of the Second Workshop on Responsible Recommendation, 2018 (Year: 2018).

Data Bias and Algorithmic Discrimination University of Montreal, 2017 (Year: 2017).

Demaine, Erik D., et al., "Correlation clustering in general weighted graphs", Theorectical Computer Science 361 2006)172-187.

Gates, Susan Wharton et al., 4/3 Automated Underwriting: Friend or Foe to Low-Mod Households and Neighborhoods? Building Assets, Building Credit, Symposium, Nov. 2003 (Year: 2003).

International Preliminary Report on Patentability dated Aug. 4, 2015 in corresponding PCT Application No. PCT/US2014/014047.

International Preliminary Report on Patentability issued in PCT/US2013/060208, dated Mar. 24, 2015, 8 pages.

International Search Report and Written Opinion for application No. PCT/US20/062235, dated Mar. 10, 2021.

International Search Report and Written Opinion for application No. PCT/US20/062271 dated Feb. 26, 2021.

International Search Report and Written Opinion issued in PCT/US2020/062235, dated Mar. 10, 2021, 8 pages.

International Search Report and Written Opinion issued in PCT/US2020/062271, dated Feb. 26, 2021, 8 pages.

International Search Report and Written Opinion of the ISA for application No. PCT/20/23370 dated Jun. 18, 2020.

International Search Report dated May 5, 2014 in corresponding PCT Application No. PCT/ US2014/014047.

International Search Report issued in PCT/US2013/060208, dated Jan. 7, 2014, 2 pages.

Ivanov, Alexei, et al., "Kolmogorov-Smirnov test for feature selection in emotion recognition from speech", IEEE International Conference on acoustics, speech and signal processing (ICASSP), 2012, pp. 5125-5128.

Johnson, Kristen, et al., "Artificial Intelligence, Machine Learning, and Bias in Finance: Toward Responsible Innovation", Fordham Law Review, vol. **, Issue 2, Article 5,2019, pp. 499-529.

Lippert, John, "ZestFinance Issues small, high-rate loans, uses big data to weed out deadbeats", The Washington Post, Oct. 12, 2014.

Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 ( Year: 2018).

Nesiba, Reynold F., "The Color of Credit: Mortgage Discrimination, Research Methodology, and Fair-Lending Enforcement", Journal of Economic Issues, 37 (3), 813-815, 2003.

Office Action (Final Rejection) dated Nov. 18, 2021 for U.S. Appl. No. 16/052,293 (pp. 1-18).

Office Action (Final Rejection) dated Dec. 7, 2021 for U.S. Appl. No. 16/109,545 (pp. 1-17).

Office Action (Non-Final Rejection) dated Dec. 16, 2021 for U.S. Appl. No. 15/977,105 (pp. 1-19).

Office Action (Notice of Allowance and Fees Due (PTOL-85)) dated Nov. 19, 2021 for U.S. Appl. No. 16/292,844 (pp. 1-8).

Ribeiro, Marco Tulio et al., Why Should I Trust You?—Explaining Predictions of Any Classifier ACM, 2016 (Year: 2016).

(56) References Cited

OTHER PUBLICATIONS

Strobl, Carolin, et al., "Conditional Variable Importance for Random Forests", BMC Bioinformatics 2008, 9:307, published Jul. 11, 2008.

Tuv, Eugene, et al., "Feature Selection with Ensembles, Artificial Variables, and Redundancy Elimination", Journal of Machine Learning Research, pp. 1341-1366, Jul. 2009.

Wattenber, Martin et al., Attacking discrimination with smarter machine learning Google Research, 2016 (Year: 2016).

ZestFinance releases new software tool to reduce bias in AI-powered credit scoring models: New fairness filter can put 170,000 more minority families into homes. (Mar. 19, 2019). PR Newswire Retrieved from https://dialog.proquest.com/professional/docview/2193594346?accountid=131444 (Year: 2019).

Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.

Zhao, Zheng, et al., "On Similarity Preserving Feature Selection", IEEE Transactions on Knowledge and Data Engineering 25, 2011, pp. 619-632.

Gehrlein, William et al., A two-stage least cost credit scoring model, 1997, Annals of Operations Research, pp. 159-171.

International Search Report and Written Opinion for Application No. PCT/US18/44874, dated Oct. 10, 2018.

International Search Report and Written Opinion for Application No. PCT/US18/030966, dated Jul. 20, 2018.

Saabas, Ando, "Diving into data, A blog on machine learning, data mining and visualization, Interpreting random forests", http://blog.datadive.net/interpreting-random-forests/ (spec), Oct. 19, 2014.

Saabas, Ando, "Diving into data, A blog on machine learning, data mining and visualization, Random forest Interpretation—conditional feature contributionsRandom", http://blog.datadive.net/random-forest-interpretation-conditional-feature-contributions/ (spec), Oct. 26, 2016.

Saabas, Ando, "Diving into data, A blog on machine learning, data mining and visualization, Random forest interpretation with scikit-learn", http://blog.datadive.net/random-forest-interpretation-with-scikit-learn/ (spec), Aug. 12, 2015.

Sundararajan, Mukund, et al., "Axiomatic Attribution for Deep Networks", Proceeding of the 34th International Conference on Machine Learning, Sydney, Australia, PMLR 70, Jun. 13, 2017.

* cited by examiner

| Decomposition of Model A with respect to American Indian and Pacific Islanders |||
|---|---|---|
| Feature Name | Feature Contribution | Feature Description |
| Var1 | 2.341025641 | Missing bankruptcy type in any bureau summary |
| Var2 | 1.975897436 | Bankruptcy type values across all bureau summaries |
| Var3 | 1.863076923 | Number of distinct industry codes for debts according to Experian |
| Var4 | 1.663076923 | Percentage of revolving credit available according to all bureaus |
| Var5 | 1.342051282 | Chapter 7 bankruptcy present in any bureau file |
| Var6 | 1.322051282 | Chapter 13 bankruptcy present in any bureau file |
| Var7 | 1.302051282 | Ratio of collections attempts to number of tradelines across all 3 bureaus |
| Var8 | 1.262051282 | Sum of credit limits for recent inquiries according to Experian tradelines |

FIGURE 6

SYSTEMS AND METHODS FOR PROVIDING MACHINE LEARNING MODEL EVALUATION BY USING DECOMPOSITION

CROSS-REFERENCE TO RELATED APPLICATIONS

This application claims the benefit of U.S. Provisional Application No. 62/641,176 filed 9 Mar. 2018, which is incorporated in its entirety by this reference.

TECHNICAL FIELD

This disclosure relates generally to the machine learning field, and more specifically to new and useful systems and methods for evaluation of a machine learning model by using decomposition.

BACKGROUND

As complexity of machine learning systems increases, it becomes increasingly difficult to explain results generated by machine learning systems. While computer scientists understand the specific algorithms used in machine learning modelling, the field has generally been unable to provide useful explanations of how a particular model generated by anything but the simplest of algorithms works. This has limited their adoption by businesses seeking to solve high stakes problems which require transparency into a model's inner workings.

There is a need in the machine learning field for new and useful systems for explaining results generated by machine learning models. The disclosure herein provides such new and useful systems and methods.

BRIEF DESCRIPTION OF THE FIGURES

FIG. 6 is a representation of a user interface, according to embodiments.

DESCRIPTION OF EMBODIMENTS

Figure 1A:
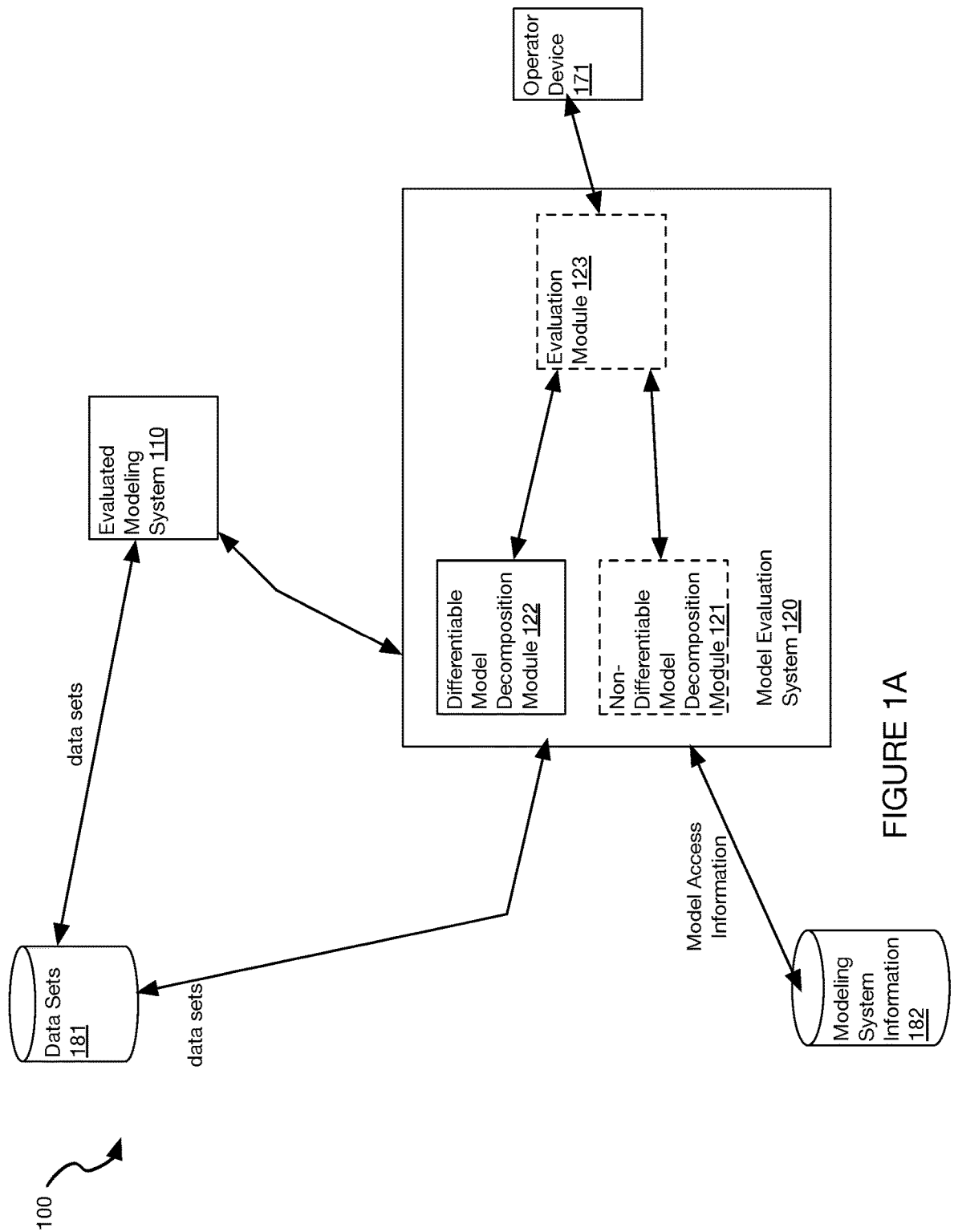
FIGS. 1A and 1B are schematic representations of a system, according to embodiments.

The following description of embodiments is not intended to limit the disclosure to these embodiments, but rather to enable any person skilled in the art to make and use the embodiments disclosed herein.

1. OVERVIEW

In particular, there is a need in the machine learning field to provide model explainability information for a machine learning model in order to comply with regulations such as the Equal Credit Opportunity Act, the Fair Credit Reporting Act, and the OCC and Federal Reserve Guidance on Model Risk Management, which require detailed explanations of the model's inner workings, and explanations of each model-based decision.

Disparate impact under some laws and regulations, e.g., 15 U.S.C. § 1691, 42 U.S.C. § 3604, refers to practices in employment, housing, insurance, and other areas that adversely affect one group of people of a protected characteristic more than another, even though rules applied by government entities, businesses, employers or landlords, for example, appear to be neutral and non-discriminatory. Some protected classes include classes based on race, color, religion, national origin, sex, age, and disability status as protected characteristics.

A violation of a law or regulation may be proven by showing that an employment practice or policy has a disproportionately adverse effect on members of the protected class as compared with non-members of the protected class. Therefore, the disparate impact theory prohibits employers from using a facially neutral employment practice that has an unjustified adverse impact on members of a protected class. A facially neutral employment practice is one that does not appear to be discriminatory on its face, but is discriminatory in its application or effect. Where a disparate impact is shown, a plaintiff can prevail in a lawsuit without the necessity of showing intentional discrimination unless the defendant entity demonstrates that the practice or policy in question has a demonstrable relationship to business requirements. This is the "business necessity" defense.

It is useful for an entity (e.g., government, business) that uses machine learning systems to make decisions to understand whether decisions generated by such machine learning systems have a disproportionately adverse effect on members of a protected class as compared with non-members of a protected class. However, as complexity of machine learning systems increases, it becomes increasingly difficult to determine whether outcomes generated by machine learning systems disparately impact a protected class. In particular, embodiments herein include a method of using machine learning model interpretations to determine whether a heterogeneous, ensembled model has disparate impact, which of the variables used in the model are driving the disparity, the degree to which they are driving the disparity, and their relationship to business objectives such as profitability.

There is a need in the machine learning field for new and useful systems for determining whether a machine learning model is likely to generate results that disparately impact a protected class. There is a further need to determine the degree to which each variable used in a model may be causing disparate impact, and the degree to which each variable may be driving financial outcomes such as losses, interest income, yield, and LTV, so that a model developer may take the required steps (e.g., by suppressing a problematic variable, or, in other cases, by justifying its business impact). The disclosure herein provides such new and useful systems and methods.

In addition to understanding how a model makes decisions in general, it is also useful to understand how a model makes a specific decision or how a model computes a specific score. Such explanations are useful so that model developers can ensure each model-based decision is reasonable. These explanations have many practical uses, and for our purpose they are particularly useful in explaining to a consumer how a model-based decision was made. In some jurisdictions, and for some automated decisioning processes, these explanations are mandated by law. For example, in the United States, under the Fair Credit Reporting Act $1_5$ U.S.C. § 1681 et seq, when generating a decision to deny a consumer credit application, lenders are required to provide to each consumer the reasons why the credit application was denied. These adverse action reasons are easily provided when the model used to make a credit decision is a simple, linear model. However, more complex, ensembled machine learning models have heretofore proven difficult to explain. The disclosure herein provides such new and useful systems and methods for explaining each decision a machine learning model makes.

Machine learning models are often ensembles of heterogeneous sub-models. For example, a neural network may be combined with a tree-based model such as a random forest, or gradient-boosted tree by averaging the values of each of the sub-models to produce an ensemble score. Other computable functions can be used to ensemble heterogeneous submodels. There is a need in the machine learning field for new and useful systems for determining for explaining results generated by heterogeneous ensembles of machine learning models. The disclosure herein provides such new and useful systems and methods.

Machine learning models undergo a lifecycle, from development, to testing, analysis and approval, to production and ongoing operations. There is a need in the machine learning field for new and useful systems for storing, updating, and managing machine learning model metadata across the machine learning model lifecycle. The disclosure herein provides new and useful systems for automatically generating machine-readable descriptions of models, features, and analyses which can be used to create model governance and model risk management documentation throughout the modeling life cycle. These systems and methods substantially contribute to an organization's compliance with OCC Bulletin 2011-12, Supervisory Guidance on Model Risk Management, which is incorporated herein by reference.

A model evaluation system and related methods are provided. The model evaluation system (e.g., 120 shown in FIG. 1A) functions to interact with a trained model and generate explanation information that indicates a degree to which variables (features) or groups of variables used by the trained model affect outputs (e.g., driving control outputs of an autonomous driving model, credit scores generated by a credit model, numerical outputs representing model output results, and the like) generated by the trained model. In a first embodiment, the explanation information can be used to determine a degree to which a variable (or group of variables) disproportionately affects model outputs for a population of input data sets (e.g., datasets received by the trained model as inputs). Such a population of input data sets can have common values for one or more variables. As an example, a population can include input data sets with a common zipcode value. In a second embodiment, the explanation information can be used to determine a degree to which a variable (or group of variables) affects a particular model output generated for a particular input data set. As an example, the explanation information can identify variables that had a largest impact on a credit score generated by a trained credit scoring model for a particular individual. The model evaluation system can be used to generate explanation information for trained models used for any type of use, such as in making lending decisions, controlling vehicles, interpreting medical results, interpreting sensor data, and the like.

In some embodiments, the model evaluation system provides the generated explanation information to an operator device. In a first embodiment, the explanation information is included as message content of a message sent by the model evaluation system to the operator device. In a second embodiment, the explanation information is included in a file that is transmitted to the operator device. In a third embodiment, the explanation information can be transmitted as a data object (e.g., having a JSON format). In a fourth embodiment, the model evaluation system generates a user interface, includes the explanation information in the user interface, and transmits the user interface to the operator device. In a first example, the user interface is a document containing user interface instructions for controlling an application at the operator device. The use interface instructions can be markup language instructions and/or tags (e.g., HTML instructions and/or tags) to be processed by an application at the operator device (e.g., a Web browser). In a second example, the user interface is an image file. In a fifth embodiment, the explanation information is displayed directly on an operator display device by the model evaluation system. For example, the model evaluation system can be included in an autonomous vehicle that is being controlled by driving outputs generated by a trained driving model, and the model evaluation system can evaluate the driving model in real-time and display explanation information for driving actions at a display device included in the vehicle. In this manner, a passenger of the vehicle can understand a reasoning behind each driving decision made by the driving model and evaluate whether the driving model is operating the vehicle in a reasonable manner.

In some embodiments, the model evaluation system generates a model risk management document that includes the generated explanation information, and provides the model risk management document to an operator device.

The model evaluation system (e.g., 120 shown in FIG. 1A) functions to interact with any type of trained model. In some embodiments, the model is a single model. In some embodiments, the model is a heterogeneous ensemble model. In some embodiments, the model is a homogeneous ensemble model. In a first embodiment, the model is a linear ensemble model. In a second embodiment, the model is a fixed linear ensemble model. In a third embodiment, the model is a bagged ensemble model. In a fourth embodiment, the model is a boosted ensemble model. In a fifth embodiment, the model is a stacked ensemble model.

In some embodiments, the model is an ensemble model and each sub-model of the ensemble model is a continuous submodel that is differentiable at each point in the input space of the sub-model. In some embodiments, the model is an ensemble model and at least one sub-model of the ensemble model is a submodel with at least one discontinuity, such that the model is not differentiable in at least one point in the input space of the sub-model.

In some embodiments, the model evaluation system (e.g., 120 shown in FIGS. 1A and 1B) functions to generate explanation for continuous models by performing a decomposition process for differentiable models (e.g., by using the module 122 shown in FIG. 1A) relative to a baseline input data set (or by performing a set of decompositions relative to each input data set of a baseline population).

In some embodiments, the model evaluation system (e.g., 120 shown in FIGS. 1A and 1B) functions to generate explanation information for models with at least one discontinuity by performing a decomposition process for non-differentiable models (e.g., by using the module 121 shown in FIG. 1A) relative to a baseline population if input data sets. In some embodiments, the model evaluation system (e.g., 120 shown in FIGS. 1A and 1B) functions to generate explanation information for both continuous and discontinuous models by performing a decomposition process for differentiable (continuos) models (e.g., by using the module 122 shown in FIG. 1A) and by performing a decomposition process for non-differentiable models (e.g., tree models)

(e.g., by using the module 121 shown in FIG. 1A), relative to a baseline population of input data sets.

The selection of the baseline population input data sets determines what can be explained by the generated decompositions. As an example, by performing decomposition relative to a baseline population that represents an applicant that received a "barely approved" credit score from the model being evaluated, the decompositions can identify features of a denied credit application that most likely contributed to denial of credit. As an example, a model result generated for an input data set representative of a protected class of people can be decomposed relative to a baseline population representative of a total population of people (or an unprotected class of people) to see if features unique to the protected class had a significant impact on the model result generated for the protected class. As an example, by performing decomposition relative to a baseline population that represents features of an autonomous vehicle driving model that received a "barely approved" driving compliance score from the model being evaluated, the decompositions can identify features of a denied autonomous vehicle driving model that resulted in a failing driving compliance score.

In some embodiments, the model evaluation system evaluates and explains the model by generating score explanation information for a specific output (e.g., a credit score) generated by the model for a particular input data set. In some embodiments, the output explanation information is used to generate Adverse Action information for a credit score output by the model. In some embodiments, the output explanation information is used to generate an Adverse Action letter in order to allow lenders to comply with 15 U.S.C. § 1681 et. seq.

In some embodiments, the model evaluation system 120 evaluates the model by generating information that indicates whether the model is likely to generate results that disparately impact a protected class. In other embodiments, the model evaluation system evaluates the model by generating information that allows the operator to determine whether the disparate impact has adequate business justification. Together these allow a lender to substantially comply with the Equal Credit Opportunity Act of 1974, 15 U.S.C. § 1691 et. seq.

In some embodiments, the model (e.g., the model used by modeling system no) is a fixed linear ensemble. For each input data set, the model evaluation system (e.g., 120) evaluates the ensemble model by generating an ensemble decomposition, and the model evaluation system generates the ensemble decomposition by generating a linear combination of the decompositions of each sub-model (e.g., generated by 121 and/or 122) by determining a product of the decomposition of each sub-model and the ensemble coefficient the sub-model, and determining a sum of each product. For example, for an ensemble model E represented as a linear combination of sub-models M1 and M2, with coefficients C1 and C2 (e.g., $E = C_1 M_1 + C_2 M_2$), the decomposition of E (e.g., $D_E$) is represented as the linear combination of the decomposition D1 of the sub-models M1 and the decomposition D2 of the sub-model M2, according to the respective ensemble model coefficients C1 and C2 (e.g., $D_E = C_1 D_1 + C_2 D_2$). In some embodiments other ensemble methods are used, for example bagging, boosting, and stacking. These may be decomposed by the model evaluation system (e.g., 120) in a similar way, first by decomposing submodels and then by combining the decompositions of the submodels based on the ensemble equation (as specified by ensemble information of the modeling system being evaluated).

In some embodiments, a decomposition for a model output includes a feature contribution value for each feature (variable) of the input data set used by the model to generate the model output.

In some embodiments, a tree model decomposition module (e.g., 121) is constructed to perform a feature contribution of forests decomposition process to generate a decomposition of a model output for a given input data set.

In some embodiments the tree model decomposed by the model evaluation system (e.g., 120) is a gradient boosted tree.

In some embodiments, the differentiable model decomposition module (e.g, 122) generates a decomposition of a model output for a given input data set by computing at least one gradient of the model.

2. SYSTEMS

Figure 1B:
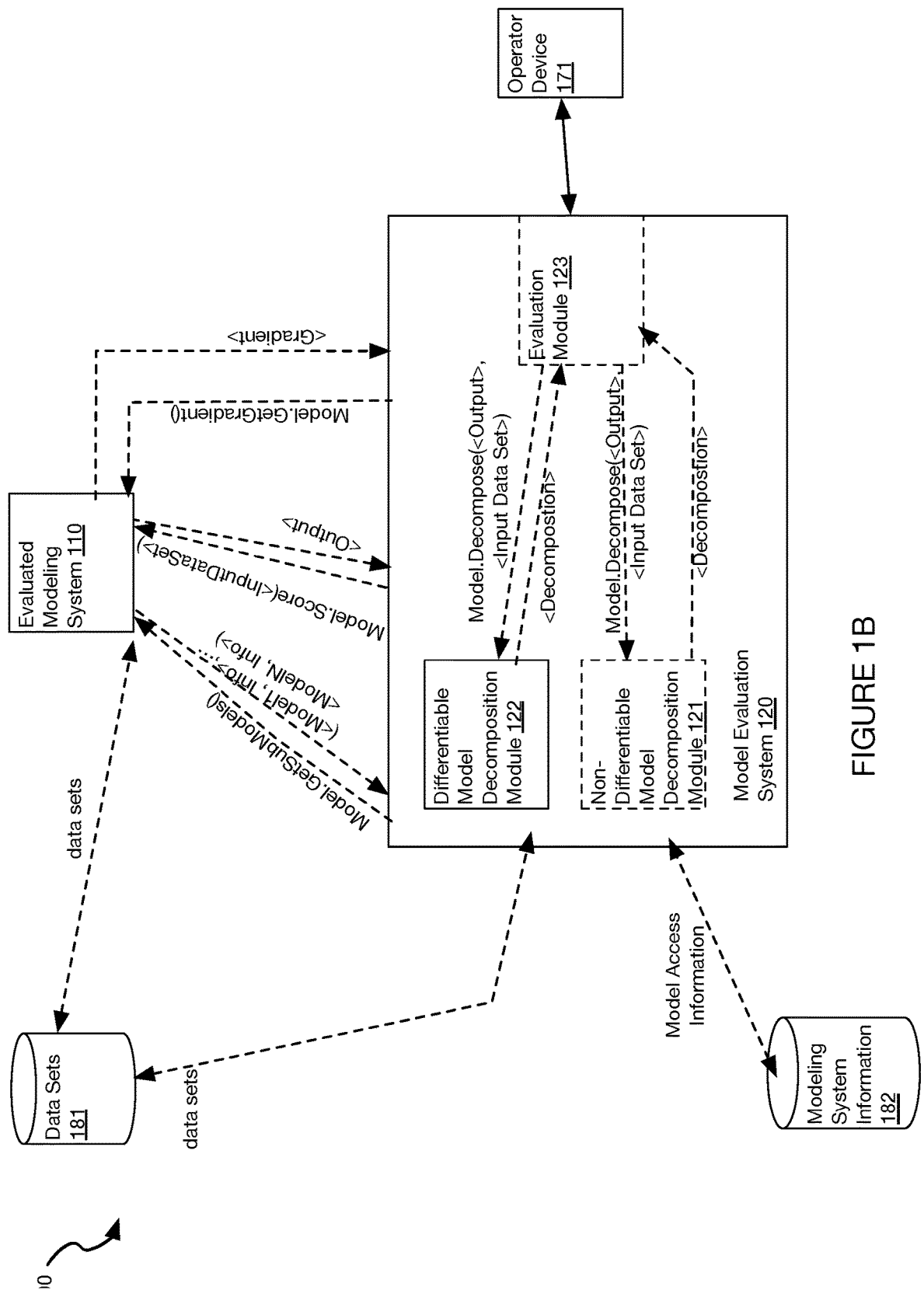

FIGS. 1A-B are a schematic representations of a system 100, according to embodiments. In some embodiments, the system 100 includes a model evaluation system 120 and a modeling system no that is to be evaluated by the model evaluation system 120. FIG. 1B depicts exemplary API requests and responses between the model evaluation system 120 and the modeling system 110, and exemplary requests and responses between the evaluation module 123 and the differentiable model decomposition module 122 and the non-differentiable model decomposition module 121.

In some embodiments, the model evaluation system (e.g., 120 shown in FIGS. 1A-B) includes a non-differentiable model decomposition module (e.g., 121 shown in FIGS. 1A-B), a differentiable model decomposition module (e.g., 122 shown in FIGS. 1A-B), and an evaluation module (e.g., 123 shown in FIGS. 1A-B). In some embodiments, the model evaluation system 120 includes an API (Application Programming Interface) module. In other embodiments, the model evaluation system 120 includes modules that implement black box evaluation methods such as permutation importance disclosed in U.S. application Ser. No. 15/970, 626 filed 3 May 2018, incorporated herein in its entirety by this reference.

In some embodiments, the model evaluation system (e.g., 120 shown in FIGS. 1A-B) includes a differentiable model decomposition module (e.g., 122 shown in FIGS. 1A-B), and an evaluation module (e.g., 123 shown in FIGS. 1A-B). In some embodiments, the model evaluation system 120 includes an API (Application Programming Interface) module. In some embodiments, the modeling system 110 includes a non-differentiable model decomposition module (e.g., a tree decomposition module similar to the treemodel decomposition module 121)

In some embodiments, the model evaluation system 120 is communicatively coupled to a modeling system (e.g., no shown in FIGS. 1A-B). In some embodiments, the model evaluation system 120 is communicatively coupled to an external modeling system (e.g., no shown in FIGS. 1A-B) via a public network. In some embodiments, the model evaluation system 120 is communicatively coupled to a modeling system via a private network. In some embodiments, the model evaluation system is included in a modeling system. In some embodiments, the model evaluation system is communicatively coupled to an external modeling system via an API module of the model evaluation system. In some embodiments, the model evaluation system is communicatively coupled to an external modeling system via an API module of the modeling system.

In some embodiments, the model evaluation system 120 is communicatively coupled to an operator device 171.

In some embodiments, the model evaluation system 120 is communicatively coupled to a storage device 181 that includes input data sets.

In some embodiments, the model evaluation system 120 is communicatively coupled to a storage device 182 that includes modeling system information for the modeling system 110.

In some embodiments, a model evaluation system (e.g., 120) that includes a differentiable model decomposition module (e.g., 122) is included in an autonomous vehicle that includes a driving model system (e.g., 110). The model evaluation system is communicatively coupled to the driving model system, and a user output device of the vehicle. The user output device can be any one of a display screen, a speaker, a light system, a haptic system, and the like.

In some embodiments, a model evaluation system (e.g., 120) that includes a differentiable model decomposition module (e.g., 122) is included in an autonomous drone (or robot) that includes a navigation model system (e.g., 110). The model evaluation system is communicatively coupled to the navigation model system, and a remote operator device via a network. In a first example, the model evaluation system can transmit variable identifiers and/or variable values contributing to navigational outputs to operator device so that the operator can understand a navigation policy used by the drone. In a second example, the model evaluation system can determine if geographic areas are being disproportionately patrolled by the drone, and notifying the operator device if any disproportionate patrolling is being performed by the drone.

In some embodiments, a model evaluation system (e.g., 120) that includes a differentiable model decomposition module (e.g., 122) is included in an autonomous or semi-autonomous surveillance robot (or drone or camera) that includes a surveillance model system (e.g., no) that determines where to perform surveillance (e.g., by using image and/or audio capture devices) and what individuals or events to target for increased surveillance. The model evaluation system is communicatively coupled to the surveillance model system, and a remote operator device via a network. In a first example, the model evaluation system can transmit variable identifiers and/or variable values contributing to surveillance outputs to operator device so that the operator can understand a surveillance policy used by the robot. In a second example, the model evaluation system can determine if geographic areas are being disproportionately observed by the robot, and notifying the operator device if any disproportionate observation is being performed by the robot. For example, explanation information can be used to determine why the surveillance instructs the robot to zoom in on an image of a particular person. As another example, explanation information can be used to determine whether the surveillance robot is disproportionately observing people of a protected class.

In some embodiments, the modeling system no is a vehicle computing system that uses at least one of a continuous model and a tree model to generate a vehicle output from vehicle sensor data. In some embodiments, each vehicle output is one of a vehicle control output and an alert output. In some embodiments, each input data set represents vehicle sensor data. In some embodiments, model output decompositions indicate one or more reasons for generation of a vehicle output. In some embodiments, model output explanation information is generated, as described herein, and the model output information indicates one or more reasons for generation of a vehicle output. In some embodiments, the vehicle computing system functions to control navigation of an autonomous vehicle. In some embodiments, the vehicle computing system functions to control a driving component of a vehicle. In a first variation, a driving component is a braking system. In a second variation, a driving component is a steering system. In a third variation, a driving component is an adaptive cruise control system. In a fourth variation, a driving component is a four-wheel drive control system. In some embodiments, the vehicle computing system functions to control an alert system of a vehicle. In a first variation, the alert system is a lane departure alert system. In a second variation, the alert system is a blind spot detection system. In a third variation, the alert system is a parking assist system system. In some embodiments, the model evaluation system, the modeling system, and the operator device are included in a vehicle. In some embodiments, the model evaluation system, and the modeling system are included in a vehicle, and the model evaluation system stores generated explanation information in a vehicle log file stored at a storage device of the vehicle. In some embodiments, the model evaluation system, and the modeling system are included in a vehicle, and the model evaluation system stores generated model output decompositions in a vehicle log file stored at a storage device of the vehicle. In some embodiments, the model evaluation system is included in the vehicle computing system.

3. FIG. 2

Figure 2:
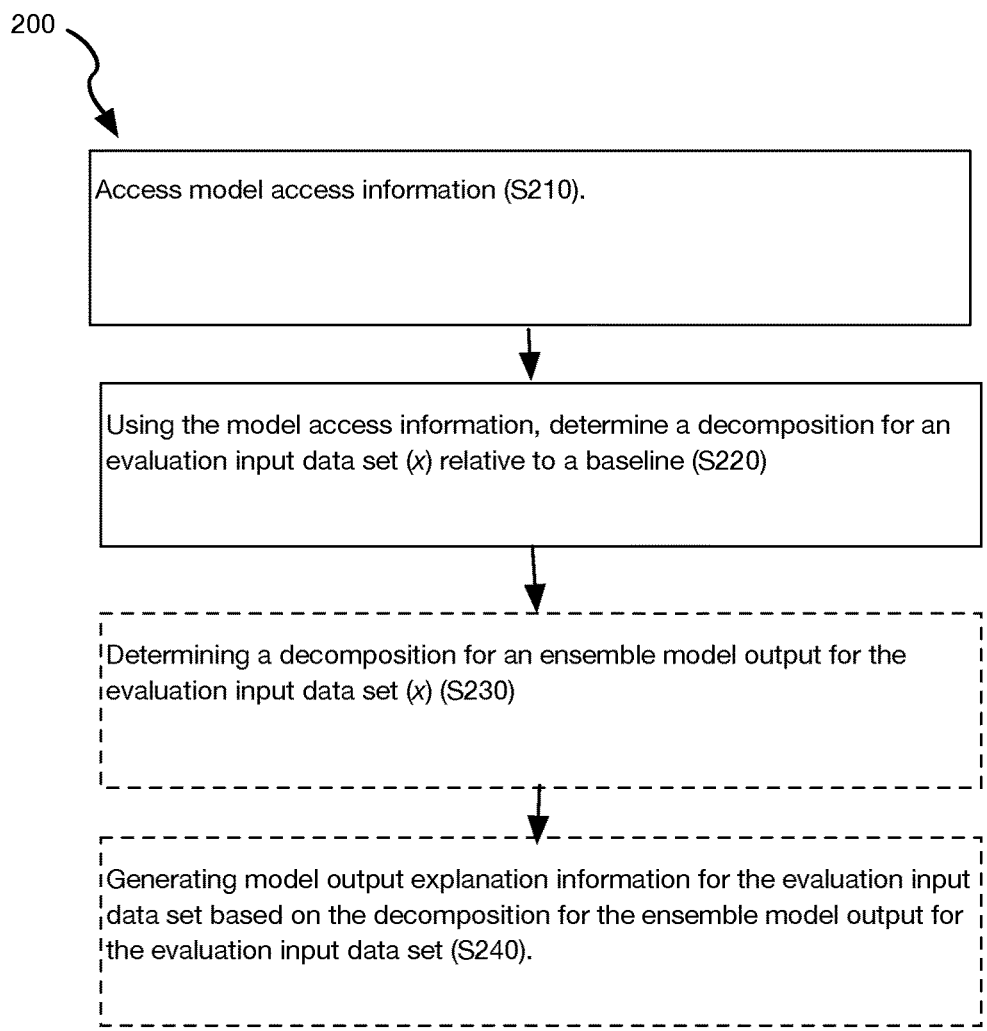
FIG. 2 is a representation of a method, according to embodiments.

FIG. 2 is a representation of a method, according to embodiments. In some embodiments, the method 200 shown in FIG. 2 is performed by the model evaluation system 120 shown in FIGS. 1A-B.

The method functions to generate model evaluation information (e.g., model output decompositions) for any type of model, such as a single model, or an ensemble model (e.g., heterogeneous, homogeneous) that performs ensembling by any one of a linear combination, bagging, boosting, and stacking.

In some embodiments, the method 200 includes: the model evaluation system (e.g., 120 shown in FIGS. 1A-B) accessing model access information for the model (process S210). In the case of an ensemble model, the model access information includes information for each sub-model of the ensemble, as well as ensembling information that indicates how outputs of each sub-model are ensembled to generate a final output of the ensemble model. For a linear ensemble, the ensembling information includes sub-model coefficients for each sub-model of the ensemble mode. For a bagged ensemble, the ensembling information specifies a bagging function. For a boosted ensemble, the ensembling information specifies a boosting function. For a stacked ensemble, the ensembling information specifies a stacking function.

In some embodiments, the model evaluation system 120 accesses the model access information from the modeling system (e.g., no shown in FIGS. 1A-B) (e.g., via one or more remote procedure calls, one or more local procedure calls, an API of the modeling system, an API of the model evaluation system). In some embodiments, the model evaluation system 120 accesses the model access information from a storage device (e.g., 182 shown in FIGS. 1A-B).

In some embodiments, the model access information for a model includes information for accessing input data sets for a baseline population. In some embodiments, the model access information for model includes information for accessing a model output generated by the model for a specified input data set. In some embodiments, the model access information for a model includes input data sets for a baseline population. In some embodiments, the model access information for a model includes model outputs generated by the model for input data sets of a baseline population. In some embodiments, the model access information for a model includes API information for the model or sub-model of the model. In some embodiments, the model access information for a model includes a URL and corresponding authentication information for accessing input data sets for the model and generating a model output for a specified input data set by using the model.

In some embodiments, S210 includes accessing tree structure information from the modeling system, that is used to perform tree model decomposition, as described herein. In some embodiments, S210 includes accessing accessing ensemble information from the modeling system, the ensemble information identifying an ensembling function used to ensemble outputs of sub-models of an ensemble model of the modeling system. In some embodiments, S210 includes accessing gradient interface information used by the model evaluation system to generate gradients for a continuous model of the modelling system.

In some embodiments, S210 includes accessing information for generating a gradient by using a gradient interface of the model (single or ensemble model) being evaluated.

In some embodiments, the model being evaluated by the system 120 is a single differentiable model. In some embodiments, the model being evaluated by the system 120 is a single non-differentiable model (meaning that a derivative is undefined for at least one point in the input space of the model). In some embodiments, the model is an ensemble model, and each sub-model is a differentiable model. In some embodiments, the model is an ensemble model, and each sub-model is a non-differentiable model. In some embodiments, the model is an ensemble model, and at least one sub-model is a differentiable model and at least one sub-model is a non-differentiable model. In some embodiments, the model is an ensemble model that includes at least one tree sub-model and at least one differentiable sub-model. In some embodiments, the ensemble model is a fixed linear ensemble model.

In some embodiments, the method 200 includes: for each model specified by the model access information, the model evaluation system (e.g., 120) determining a decomposition for a model output for an evaluation (observation) input data set (x) relative to a baseline (population of input data sets or single input data set) (process S220). In some embodiments, the baseline is a single input data set. In some embodiments, the baseline is a population of input data sets. In some embodiments, the method 200 includes: the model evaluation system 120 accessing the evaluation input data set from the modeling system no. In some embodiments, the method 200 includes: the model evaluation system 120 accessing the evaluation input data set from a storage device (e.g., 181 shown in FIGS. 1A-B). In some embodiments, the method 200 includes: the model evaluation system accessing the evaluation input data set and the corresponding model output for each model (specified by the model access information) from the modeling system no. In some embodiments, the method 200 includes: for each model specified by the model access information, the model evaluation system accessing a model output for the evaluation input data set. In some embodiments, the method 200 includes: the model evaluation system accessing the evaluation input data set, and generating the corresponding model output for each model (e.g., ensemble, sub-model, single model) by accessing the modeling system (e.g., no). In some embodiments, the method 200 includes: for each model specified by the model access information, the model evaluation system generating a model output for the evaluation input data set by accessing the modeling system. In some embodiments, the method 200 includes: for each model specified by the model access information, the model evaluation system determining a decomposition for a model output for an evaluation input data set (x) by using the baseline (process S220).

In some embodiments, the baseline is a population of input data sets. In some embodiments, the baseline is a single input data set. In some embodiments, the baseline is generated according to baseline selection criteria. In some embodiments, baseline generation criteria includes selection criteria for selecting input data sets from historical input data sets of the model. In some embodiments, the method 200 includes providing, to an operator device, a graphical user interface constructed to receive user input specifying the baseline generation criteria, and the baseline generation criteria is received via the graphical user interface. Generating the baseline includes: selecting input data sets in accordance with the selection criteria. In some embodiments, selecting the baseline includes generating a baseline input data set from the selected input data sets (e.g., by averaging values, sampling, generating using a combination function, etc.).

In some embodiments, in a case where the model being evaluated is an ensemble model, the method 200 includes: the model evaluation system (e.g., 120) determining a decomposition for an ensemble model output for the evaluation input data set (x) (process S230). In some embodiments, the method 200 includes: the model evaluation system 120 determining a decomposition for an ensemble model output for the evaluation input data set (x) by ensembling the decompositions for the sub-model outputs in accordance with the ensembling information included in the model access information for the ensemble model (process S230).

In some embodiments, for a linear ensemble model, the method 200 includes: determining a decomposition for the ensemble model output by generating a linear combination of the decompositions for the sub-model outputs using corresponding sub-model coefficients specified by the ensembling information.

In some embodiments, for an ensemble model, the method 200 includes: determining a decomposition for the ensemble model output by ensembling the decompositions for the sub-model outputs using an ensembling function specified by the ensembling information. In some embodiments, the ensembling function is one of a boosting function for a boosted ensemble, a bagging function for a bagged ensemble, and a stacking function for a stacked ensemble. In some embodiments, the ensemble can be any suitable type of ensemble having any suitable type of ensembling function for generating an ensemble output from outputs of sub-models of the ensemble.

In some embodiments, S220 includes receiving an observation input data set (evaluation input data set) of an ensemble model and a corresponding ensemble model output, continuous model output, and tree model output, the observation input data set being associated with a rejection. A decomposition for the continuous model output relative to a baseline population is generated by using a gradient interface of the continuous model. A decomposition for the tree model output relative to the baseline population is generated by using tree structure information for the tree model.

In some embodiments, S230 includes generating a decomposition for the ensemble model output relative to the baseline population by combining the decomposition for the continuous model output and the decomposition for the tree model output in accordance with an ensemble process identified by ensemble information for the ensemble model.

In some embodiments, the evaluation module 123 performs the process S230.

Figure 5:
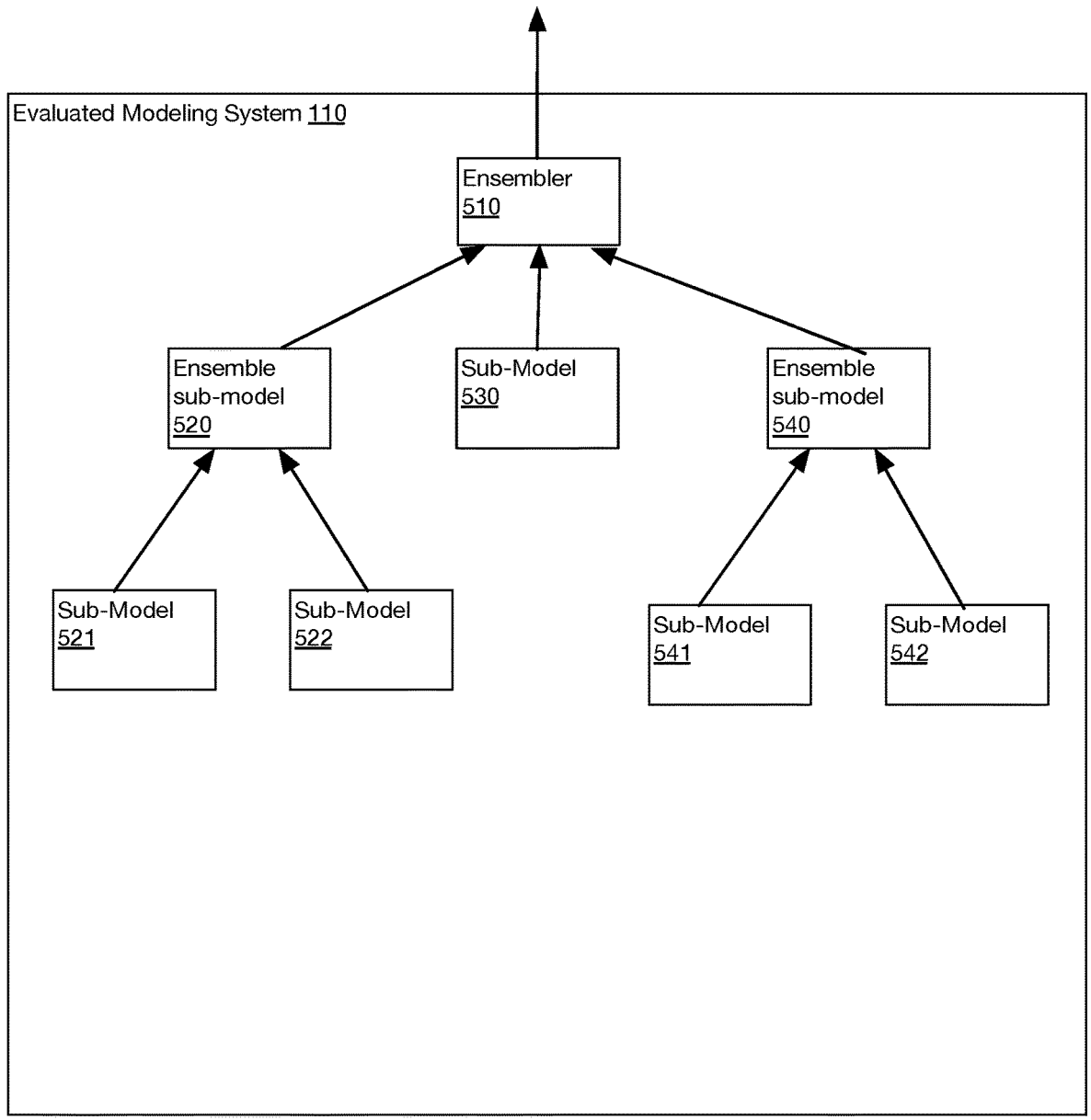
FIG. 5 is a diagram depicting a modelling system, according to embodiments.

In some embodiments, the model being evaluated is a fixed linear ensemble, and the model evaluation system determines a decomposition for the ensemble model output for the evaluation input data set (x) by generating a linear combination of the decompositions of each sub-model by determining a product of the decomposition of each sub-model and the ensemble coefficient of the sub-model, and determining a sum of each product. For example, for an ensemble model E represented as a linear combination of sub-models M1 and M2, with coefficients C1 and C2 (e.g., $E=C_1M_1+C_2M_2$), the decomposition of E (e.g., $D_E$) is represented as the linear combination of the decomposition D1 of the sub-models M1 and the decomposition D2 of the sub-model M2, according to the respective ensemble model coefficients C1 and C2 (e.g., $D_E=C_1D_1+C_2D_2$). This method can be used on ensembles of ensembles and can be applied to other ensembling methods such as stacking. In some embodiments, at least one sub-model is an ensemble model. In some embodiments, at least one sub-model is a fixed linear ensemble. In some embodiments, at least one sub-model is a stacked ensemble model. In some embodiments, at least one sub-model is a bagged ensemble model. In some embodiments, at least one sub-model is a boosted ensemble model. In some embodiments, the ensemble model is a stacked ensemble model. In some embodiments, the ensemble model is a boosted ensemble model. FIG. 5 depicts a modeling system 110 that is an ensemble of ensembles. FIG. 5 shows an ensembler 510 that ensembles outputs from the ensemble sub-model 520, the sub-model 530, and the ensemble sub-model 540. The ensemble sub-model 520 ensembles outputs from the sub-model 521 and the sub-model 522. The ensemble sub-model 540 ensembles outputs from the sub-model 541 and the sub-model 542. In some embodiments, the ensembling processes disclosed herein are specified by the ensemble information described herein.

In some embodiments, for an ensemble model being evaluated, the method 200 includes: the model evaluation system accessing the ensemble model output for the evaluation input data set from the modeling system. In some embodiments, for an ensemble model being evaluated, the method 200 includes: the model evaluation system generating the ensemble model output for the evaluation input data set by accessing the modeling system.

Non-Differentiable Model Decomposition

In some embodiments, the model evaluation system (e.g., 120) is constructed to perform decomposition for models (or sub-models) having at least one discontinuity point at which a derivative is undefined. For such models, the model evaluation system performs a decomposition process for non-differentiable models when determining a decomposition for a discontinuous model (e.g., a tree model). In some embodiments, during the decomposition process (e.g., S220), the model evaluation system determines whether the model being decomposed is differentiable (e.g., as indicated by the model access information, by an API call to the modelling system, and the like). If the model evaluation system determines that the model being decomposed is a non-differentiable model, then the model evaluation system performs decomposition for the model by performing the non-differentiable model decomposition process (e.g., by using the non-differentiable model decomposition module 121 shown in FIGS. 1A-B). In some embodiments, the model is a tree model, and the model evaluation system uses a tree model decomposition process to perform the decomposition for the tree model, as described herein. In some embodiments, the non-differentiable model decomposition module (e.g., 121 shown in FIGS. 1A-B) accesses a tree structure of the tree model from a storage device (e.g., 182 shown in FIGS. 1A-B). In some embodiments, the non-differentiable model decomposition module 121 (e.g., 121 shown in FIGS. 1A-B) accesses a tree structure of a tree model from the modeling system 110. In some embodiments, the non-differentiable model decomposition module is included in the modeling system 110, and the non-differentiable model decomposition module accesses a tree structure of the tree model. In some embodiments, the tree model is a forest, in other embodiments the tree model is a random forest, in other embodiments, the tree model is a gradient boosted tree.

In some embodiments, a non-differentiable model decomposition process for a tree (or forest) model is performed across a population of several input data sets. Before generating a decomposition for a tree model output, all of the input data sets of a training population (the input data sets used to train the tree model) are observed descending the tree model.

Observing all of the input data sets of the training population descending the tree model includes: generating and recording an output (score) for each input data set of the training population by using the tree model (each tree model output is a leaf node value of a leaf node of the tree model), and for each tree node (leaf and non-leaf) determining a percentage of outputs to which the tree node contributes (by using the accessed tree structure). Using the determined percentages for each node, a <Percentage, Value> pair is generated for each leaf node and a <Percentage, ExpectedValue> pair is generated for each non leaf node. For each leaf node, the Value of the <Percentage, Value> pair is the leaf node's value in the tree model. For each non-leaf node, the ExpectedValue of the <Percentage, ExpectedValue> pair is determined by determining the product of Percentage*Value (or Percentage*Expected Value if the child node is not a leaf node) for each child node of the parent (based on the corresponding recorded <Percentage, Value> or <Percentage, ExpectedValue> pairs), and determining the sum of the products determined for the child nodes, the sum being the ExpectedValue of the parent node used to record the <Percentage, ExpectedValue> pair for the parent node. In some embodiments, parent and child nodes are identified by the accessed tree structure.

In some embodiments, the non-differentiable model decomposition module (e.g., 121 shown in FIGS. 1A-B) determines a decomposition for a tree model output by using the <Percentage, Value> and <Percentage, ExpectedValue> pairs determined for the tree model by using the input data sets of the training population.

In some embodiments, the non-differentiable model decomposition module (e.g., 121 shown in FIGS. 1A-B) uses the <Percentage, Value> and <Percentage, ExpectedValue> pairs (generated for the tree model by using the input data sets of the training population) to determine a decomposition for a tree model output relative to a baseline population (e.g., a population of one or more input data sets). Determining a decomposition for a tree model output relative to a baseline population includes selecting the baseline population, as described herein.

In some embodiments, determining a decomposition for a tree model output (for an evaluation input data set, an input data set of a baseline population, etc.) includes: generating and recording the tree model output (score) from an input data set by using the tree model, and for each tree node (leaf and non-leaf) determining each tree node (leaf and non-leaf) that contributes to the tree model output (by using the accessed tree structure). In some embodiments, tree nodes contributing to a tree model output are recorded during generation of the tree model output by using the tree model. A node contribution value is generated for each node that contributes to the tree model output. A leaf node contribution value is the leaf's value. A non-leaf node contribution value is determined based on the Value (or ExpectedValue) of the node's child that contributes to the tree model output. In some embodiments, the contribution value for a non-leaf node is the difference between the ExpectedValue (or Value) of the contributing child node and the ExpectedValue of the node whose contribution value is being determined. For each feature of the input data set, a feature contribution to the tree model output is determined by: determining the tree nodes contributing to the output in which the feature is tested (by using the accessed tree structure), and determining a sum of node contributions for these determined tree nodes. The feature contribution values for each feature form the decomposition for the tree model output. For a forest, a feature's contribution for each tree of the forest is determined (as described herein), and the feature contribution values across all trees of the forest are summed to arrive at a decomposition for the forest.

In some embodiments, determining a decomposition for a tree model output relative to a baseline population includes selecting the baseline population, as described herein, and using the non-differentiable model decomposition module (e.g., 121 shown in FIGS. 1A-B) to determine a decomposition for each input data set of the baseline population (by using the <Percentage, Value> and <Percentage, ExpectedValue> pairs determined for the training population). For each feature represented by the decompositions for the input data sets of the baseline population, an average value is determined for the feature (from among the feature values of the decompositions for the input data sets of the baseline population) to generate an average decomposition for the baseline population. An observation decomposition is generated for a particular model output for a given input data set (observation) by using the non-differentiable model decomposition module. The observation decomposition generated by the non-differentiable model decomposition module is a decomposition relative to the training data set used to generate the <Percentage, Value> and <Percentage, ExpectedValue> pairs. To generate an observation decomposition relative to the selected baseline population, the average decomposition for the baseline population is compared with an observation decomposition. In some embodiments, a difference is determined between the observation decomposition and the average decomposition for the baseline population, and the difference is the observation decomposition relative to the selected baseline population. By generating the observation decomposition relative to the selected baseline population, such a decomposition can be combined with a decomposition generated for a differentiable model relative to the baseline population (as described herein) to generate an observation decomposition for an ensemble model that includes both the non-differentiable model and the differentiable model. In other words, if a differentiable model decomposition (for a first ensemble sub-model output) and a non-differentiable model decomposition (for a second ensemble sub-model output) are generated relative to the same baseline population, then the differentiable model decomposition and the non-differentiable model decomposition can be combined to generate a decomposition for the ensemble.

In some embodiments, determining a decomposition for a model output for the evaluation input data set (x) (observation input data set) by using a non-differentiable model decomposition module includes determining a decomposition for a model output for the input data set by using the non-differentiable model decomposition module for each input data set of the baseline population (e.g., by performing the tree decomposition method described herein, or by performing any other suitable type of decomposition process for a non-differentiable model). For each feature represented by the decompositions for the input data sets of the baseline population, an average value is determined for the feature (from among the feature values of the decompositions for the input data sets of the population) to generate an average decomposition for the baseline population. A decomposition for a model output for the evaluation input data set is determined by using the non-differentiable model decomposition module. For each of the features, a feature difference is determined between a feature value of the average decomposition for the baseline population and a feature value of the decomposition for the evaluation input data set, thereby generating a decomposition of the evaluation input data relative to the baseline population. In some variations, the decomposition of the evaluation input data relative to the baseline population is a linear combination of the feature differences.

Differentiable Model Decomposition

If the model evaluation system determines that the model being decomposed is a differentiable model, then the model evaluation system performs decomposition for the model by performing the differentiable model decomposition process (e.g., by using the differentiable model decomposition module 122 shown in FIGS. 1A-B). The differentiable model decomposition process for a model output for a given input data set x includes: selecting a baseline input data set (x'), and determining a value for a path integral of the gradient of the model for the feature ($x_i$) along the straightline path from the baseline input data set (x') to the input data set (x). The value for the path integral is the feature contribution value for the feature ($x_i$), and the decomposition includes the feature contribution values for each feature ($x_i$) of the input data set x.

In some embodiments, the value of the path integral is approximated via a summation, as shown in Equation 1, where the straightline path is represented as $$x' + \frac{k}{m} \times (x - x').$$

$$(x_i - x'_i) \times \sum_{k=1}^{m} \frac{\partial F\left(x' + \frac{k}{m} \times (x - x')\right)}{\partial x_i} \times \frac{1}{m} \quad \text{Equation 1}$$

for a given m, wherein $x_i$ is the variable value of the input variable i (feature i) in the evaluation input data set x, wherein $x_i'$ is the input variable value of the input variable i (feature i) in the baseline input data set, and wherein F is the model.

In some embodiments, the differentiable model decomposition module determines the value for the path integral (represented by Equation 1) by using a gradient operator of the modeling system of the model. The differentiable model decomposition module can determine a set of path integral inputs by computing a value of $$x' + \frac{k}{m} \times (x - x')$$

for each integer k in the set of integers starting at 1 and ending at m, where m is a predetermined value that indicates a number of gradient values to be computed along the straightline path. The differentiable model decomposition module can use the gradient operator to determine a gradient value for each path integral input. The sum of the determined gradient values is determined, divided by the predetermined value m, and multiplied by the difference between the evaluation input data set x and the baseline input data set x' to result in a contribution value for the feature i.

By selecting a larger value of m to determine values of path integrals, accuracy can be improved. By selecting a smaller value of m to determine values of path integrals, computational complexity can be reduced.

In some embodiments, the differentiable model is a perceptron, a feed-forward neural network, an autoencoder, a probabilistic network, a convolutional neural network, a radial basis function network, a multilayer perceptron, a deep neural network, or a recurrent neural network, including: Boltzman machines, echo state networks, long short-term memory (LSTM), hierarchical neural networks, stochastic neural networks, and other types of differentiable neural networks, without limitation.

In some embodiments, the baseline input data set is representative of a baseline population.

In some embodiments, the baseline input data set is a vector representing a fixed point. In some embodiments, the baseline input data set is a vector representing a zero vector. In some embodiments, generating the baseline input data set includes selecting an input point. In some embodiments, selecting the baseline input data set includes selecting a set of input points and constructing an input point from the selected set of input points (e.g., by averaging values of the selected set of input points). In some embodiments, selecting the baseline input data set includes selecting a set of input points of a population and constructing an input point from the selected set of input points (e.g., by averaging values of the selected set of input points).

In some embodiments, the model evaluation system 120 determines each gradient of the model for each selected value of each feature i. In some embodiments, the model evaluation system 120 uses the modeling system 110 to determine each gradient of the model for each selected value of each feature i. In some embodiments, the model evaluation system 120 uses the modeling system 110 to determine each gradient of the model for each selected value of each feature i via an API of the modeling system 110. In some embodiments, the API is an API that is accessible via a bus. In some embodiments, the API is an API that is accessible via an electrical connection. In some embodiments, the API is a REST API. In some embodiments, the API is an API that is accessible via a public network. In some embodiments, the API is an API that is accessible via an HTTP protocol. In some embodiments, the API is an API that is accessible via a remote procedure call.

In some embodiments, the model evaluation system 120 determines each gradient of the model for each selected value of each feature i (along the line path) by using a gradient operator to determine the gradients for each selected value. In some embodiments, the model evaluation system 120 uses the modeling system 120 to determine each gradient of the model for each selected value of each feature i by using a gradient operator of the modeling system no.

In some embodiments, generating the decomposition of the evaluation input data set relative to the baseline input data set includes, for each feature i of the evaluation input data set: determine a set of values v between the value $x_i$ of feature i of the evaluation input data set and the value $x'_i$ of the feature i of the baseline input data set (e.g., $v=(x_i+(k/m)(x_i))$, for $1<=k<=m$,); determining a gradient of the model for each determined value v (e.g., $$\left( \sum_{k=1}^{m} \frac{\partial F\left(x' + \frac{k}{m} \times (x - x')\right)}{\partial x_i} \right);$$

for $1<=X<=m$), for model F); determining a sum of the derivatives $$\frac{\partial F(v)}{\partial x_i} = \frac{\partial F\left(x' + \frac{k}{m} \times (x - x')\right)}{\partial x_i}$$

determining a product of the determined sum and a difference between the value $x_i$ of feature i of the evaluation input data set and the value $x'_i$ of the feature i of the baseline input data set (e.g., $$(x_i - x'_i) \times \sum_{k=1}^{m} \frac{\partial F\left(x' + \frac{k}{m} \times (x - x')\right)}{\partial x_i});$$

and determining a decomposition value $d_i$ for the feature i by dividing the determined product for feature i by m (e.g., $$(x_i - x'_i) \times \sum_{k=1}^{m} \frac{\partial F\left(x' + \frac{k}{m} \times (x - x')\right)}{\partial x_i} \times \frac{1}{m}),$$

wherein the decomposition is a linear combination of the determined decomposition values $d_i$ for each feature i of the evaluation input data set (e.g, decomposition=$d_1 + d_2 + \ldots + d_n$).

Decomposition can be performed relative to an input data set representative of a baseline population. Alternatively, decomposition can be performed relative to each input data set of a baseline population, and results of the decompositions can be combined to generate a decomposition relative to the baseline population. Decomposition relative to a baseline population enables disparate impact analysis, as described herein. Decomposition can also be performed relative to an input data set representative of a subset of a baseline population, or relative to each input data set of a subset of the baseline population. In some embodiments, the subset of the baseline population includes input data sets of the baseline population that are most similar to the evaluation input data set. In some embodiments, the subset of the baseline population includes input data sets of the baseline population that are most different from the evaluation input data set.

In a first variation, a baseline input data set representative of a baseline population is selected, and the differentiable model decomposition process is performed by using the baseline input data set representative of the baseline population. A baseline population of input data sets is selected from training data. For each numerical feature represented by the input data sets of the baseline population, an average value is determined for the feature from among the feature values of the input data sets of the baseline population. For each categorical feature represented by the input data sets of the baseline population, a mode value is determined for the feature from among the feature values of the input data sets of the baseline population. The baseline input data set includes the average feature values as the features values for the numerical features and the mode feature values as the features values for the categorical features.

In a second variation, the differentiable model decomposition process is performed for each input data set of the baseline population to generate a plurality of decompositions, one decomposition for each input data set of the baseline population. For each feature represented by the decompositions of the baseline population, a feature average is determined among the feature values of the decompositions to generate a decomposition of the evaluation input data relative to the baseline population. In some embodiments, the decomposition of the evaluation input data relative to the baseline population is a linear combination of the feature averages. In some embodiments features with categorical values are encoded as numerics using a suitable method such as one-hot encoding or another mapping specified by the modeler.

The Baseline

As described herein, decompositions for differentiable models are performed by computing path integral values for a path integral of a gradient of the differentiable model along a line path from a baseline input data set to a given input data set. Accordingly, performing such a decomposition includes selection of a baseline input data set. A single input data set can be selected for use as the baseline, or a baseline input data set can be constructed from a population of input data sets. Such baseline input data set(s) can be selected from training data used to train the model being evaluated.

Input data sets for use as a baseline can be explicitly selected, or automatically selected based on selection criteria. In some embodiments, the model evaluation system receives the selection criteria from an operator device, the model evaluation system access training data sets or historic input data sets of the model being evaluated, and selects data sets that matches the selection criteria. In some variations, each data set of training data and/or historical data for the model is explicitly matched with the selection criteria. In some variations, one or more samples of training data and/or historical data for the model are randomly selected, and data sets in the samples are matched with the selection criteria. In some embodiments, selection criteria are automatically determined based on reception of user input indicating an intended evaluation to be performed for a model. For Adverse Action notification generation for a credit model, selection criteria can specify selection of data sets representing credit applications having a credit score a predetermined percentage above an application approval credit score threshold. For Disparate Impact analysis for a credit model, selection criteria can specify selection of data sets representing credit applications having a credit score a predetermined percentage above an application approval credit score threshold. For Disparate Impact analysis for a credit model, selection criteria can specify selection of data sets representing credit applications of a total population (either including or excluding credit applications associated with one or more protected classes).

In some embodiments, the model is a credit scoring model. The model output is a score, and the baseline population is selected by sampling the training data and selecting input rows that generate a score of $0.5+/-\varepsilon$. In some variations, the baseline population is an adverse action population, i.e., the population that had applied for a loan but was denied. In a first variation, each input data set of the baseline population is an input data set of a credit applicant that has been scored by the ensemble model and received a "barely approved" score (e.g., the bottom 10% of an approved population). In other variations, the baseline population is the top 10% of the approved population. In some variations, the baseline population is a non-protected population.

A baseline input data set is generated by combining the sampled training data of the baseline population (e.g., by averaging feature values across the data sets, etc.)

In some embodiments, the model is a driving model for an autonomous vehicle, and the baseline population is selected by sampling training data for vehicle navigation that complies with a driving policy (e.g., commonly accepted driving practices, compliance with laws and regulations, and the like). By selecting a baseline population in this manner, the model evaluation system 120 can be used to determine what features and/or values of the driving module resulted in an unacceptable vehicle control output generated by the driving module (e.g., failure to stop for a pedestrian, lane departure, a traffic violation, and the like). In other words, by selecting a baseline that corresponds to proper driving, the model evaluation can help explain why an autonomous vehicle made a driving error.

In some embodiments, the baseline population is selected from a set of historical input data sets of the model based on race and ethnicity data of the historical input data sets.

In some embodiments, the baseline population is selected from a set of historical input data sets of the model based on race and ethnicity data of the historical input data sets. In some embodiments, the baseline population is selected from a set of historical input data sets of the model based on gender data of the historical input data sets. In some embodiments, the baseline population is selected from a set of historical input data sets of the model based on age data of the historical input data sets. In some embodiments, the baseline population is selected from a set of historical input data sets of the model based on military status data of the historical input data sets. In some embodiments, the baseline population is selected from a set of historical input data sets of the model based on demographic attribute data of the historical input data sets. In some embodiments, the baseline population is selected from a set of historical input data sets of the model based on a function of the data of the historical input data sets. In some embodiments, the baseline population is selected from a set of historical input data sets of the model based on one or more of user-selected selection criteria and predetermined selection criteria. In some embodiments, the baseline population is selected from a set of historical input data sets of the model based on an analysis of the model and its decomposition. In some embodiments, the baseline population is selected from a set of historical input data sets of the model based on a machine learning model. In some embodiments, the baseline population is selected from a set of historical input data sets of the model based on a random sampling of the historical input data sets. In some embodiments, the baseline population is selected from a set of historical input data sets of the model based on a machine learning model and a model decomposition.

In some embodiments, the baseline population is a set of approved applicants. In some embodiments, the baseline population is a set of approved applicants within a threshold of an approval cut-off threshold (e.g., barely approved applicants). In some embodiments, the baseline population is a set of input data sets selected based on predetermined attributes. In some embodiments, the baseline population is a set of input data sets selected based on a model decomposition. In some embodiments, the baseline population is a set of input data sets selected based on a machine learning model. In some embodiments, the baseline population is a set of input data sets selected based on a machine learning model and a model decomposition. In some embodiments, the baseline population is a set of input data sets selected based on a machine learning model, a model decomposition, and meta-data. In some embodiments, the meta-data includes meta-data generated during a model build process. In some embodiments, the meta-data includes selection criteria based on a distribution of inputs and a target outcome.

Model Output Explanation Information

In some embodiments, one or more model decompositions are used to generate explanation information that explains a reason or cause for an output generated by the model for a given input data set. As described herein, each decomposition represents the contribution of each feature (of an input data set) to a model output generated by a model (single or ensembled) being evaluated. In some variations, decompositions are represented as a linear combination of numerical feature contribution values whose sum equals the model output. In some embodiments, each feature contribution value of the decomposition is compared to an importance threshold, and any features having feature contribution values above the importance threshold are selected, and explanation information is selected based on the selected features. In some variations, one or more human readable textual explanations are stored in association with matching criteria, and if a set of selected features satisfies matching criteria for a given textual explanation, the textual explanation is accessed and used to generate an adverse action notification that is transmitted to one of an operator device, an applicant device, a notification server, and a printer.

In some embodiments, the method 200 includes: the model evaluation system generating model output explanation information for the evaluation input data set based on the decomposition for the ensemble model output for the evaluation input data set (process S240). In some embodiments, the model evaluation system generating model output explanation information for the evaluation input data set based on the decomposition for the ensemble model output for the evaluation input data set includes: generating a lookup key by using the decomposition for the ensemble model output, and performing a data lookup by using the lookup key to retrieve the model output explanation information for the evaluation input data set. In some embodiments, the lookup is a database lookup. In some embodiments, the lookup is a hash table lookup. In other embodiments the lookup is based on a semantic network. In some embodiments the lookup is based on a symbolic inference engine. In some embodiments the lookup retrieves natural language statements with included variables that refer to model features and values. In one embodiment, a natural language generator is used to generate natural language explanations based on the decomposition for the ensemble model output and the results of the lookup.

In some embodiments, the explanation information includes adverse action reason codes. In some embodiments, the adverse action reason codes are computed based on a comparison of a model decomposition (for the model whose output is being evaluated) and a predetermined dataset. In some embodiments, the predetermined dataset includes at least one of input values, model outputs (scores), and adverse action reason codes. In some embodiments, the predetermined dataset includes a set of functions to calculate the adverse action reason codes based on the model output, the model decomposition, and each variable value of the observation input data set. In some embodiments, the set of functions includes a pre-determined mapping function. In some embodiments, the mapping function is computed based on a machine learning model.

In some embodiments, the evaluation module 123 performs the process S240.

4. DISPARATE IMPACT EVALUATION

In some embodiments, one or more model decompositions are used to determine whether a model disparately impacts members of different populations and/or which features result in certain populations being treated differently by the model. For example, if a credit scoring model provides lower credit scores to women, a decomposition can be used to determine which features (variables) of input data sets (credit applications) of women result in women receiving lower scores. If the model uses a default rate to give women lower credit scores (as identified by one or more decompositions), and the population of women receiving lower scores has a higher default rate than the men being scored by the model, use of such a model to determine credit scores might be permissible. If, on the other hand, the model relies on a feature (or group of features) that can be used to identify an applicant as male or female (as identified by one or more decompositions), and such a feature has a feature contribution value above a threshold (meaning the feature significantly impacts the credit score for the applicant), then use of the model might not be permissible since it treats applicants differently for being male or female, not based on financial aspects of the credit applicant. As described herein, each decomposition represents the contribution of each feature (of an input data set) to a model output generated by a model (single or ensembled) being evaluated.

In some embodiments, at least one impact threshold is defined. The impact threshold represents a minimum impact of a feature on results generated by the model. An impact threshold can be defined such there is a likely business justification for incorporating into the model a feature having a feature contribution value (as defined by a decomposition) above a defined impact threshold. In some embodiments, an impact threshold is defined for all features. In some embodiments, individual impact thresholds are defined for one or more features. In some embodiments, an impact threshold is defined for a group of features. In some embodiments, the sum of feature contribution values for features of a defined group are is compared to a group impact threshold for the group. In some embodiments, the each feature contribution value for features of a defined group is compared to a group impact threshold for the group. In some embodiments, a combining function is defined for a group of features, the combining function is used to generate a group feature contribution from the individual feature contribution values for the features in the group, and the generated group feature contribution is compared to the group impact threshold. In some embodiments, results of comparisons between feature contribution values and corresponding feature contribution thresholds are transmitted to an operator device, such that an operator of the operator device can identify potentially suspect features (e.g., features that have a likelihood of resulting in disparate impact) and see if there is a potentially valid business justification for including these features in the model, or if they should be removed.

In some embodiments, the model evaluation system automatically retrains the model by accessing an original training data set of the model, generating a new training data set by removing features (or feature values) from the original training data set that match a list of potentially suspect features, and retraining the model with the new training data set. In some embodiments, and such features are removed if they also have a feature contribution valued below a corresponding impact threshold.

In some embodiments, the list of potentially suspect features is generated by training a protected class predictor model that predicts membership in a protected class by using training data used to train the model being evaluated. Once a protected class predictor model having an accuracy above a given threshold is determined, decomposition is performed across a set of input data sets to identify features that have a feature contribution value for the protected class predictor model above a specified threshold. Any feature having a contribution value above the specified threshold can be assumed to be a reliable predictor of membership in a protected class, and thus likely to cause disparate impact of results if included in a model used to assign results to members of a protected class. These features are selected for inclusion in the list of potentially suspect features.

In some embodiments, accuracy of a retrained model is determined to determine the impact on model accuracy from removal of the potentially suspect features. In some embodiments, information indicating accuracy of the retrained model is transmitted to the operator device (e.g., as a message, a data object, a user interface element, and the like). In some embodiments, the model evaluation system provides a graphical user interface to the operator device that displays the accuracy of the retrained model, a and the potentially suspect features removed from the original model. In some embodiments, the graphical user interface displays a selection element for receiving user selection of one of the original model and the retrained model for use in production.

Figure 3:
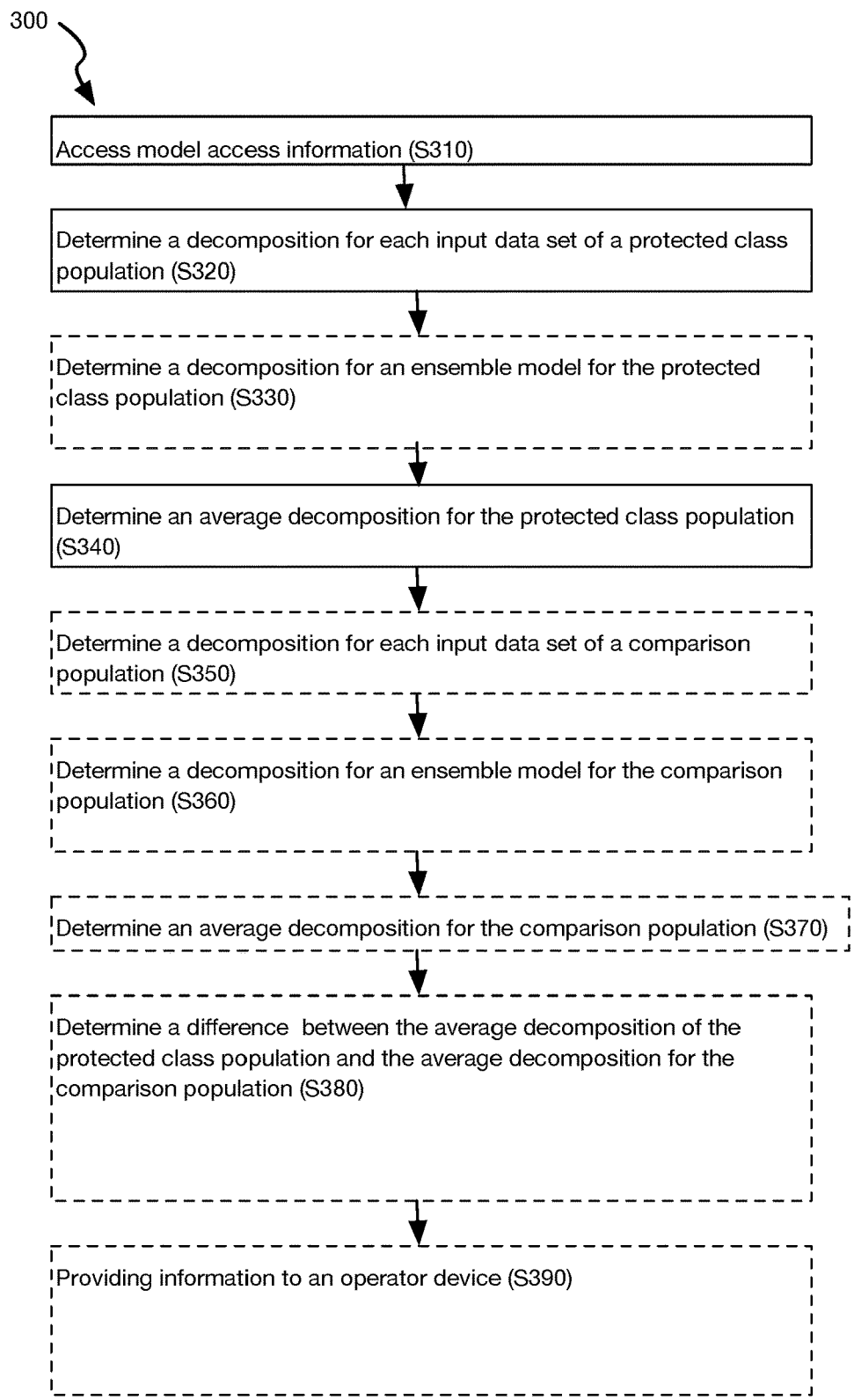
FIG. 3 is a representation of a method, according to embodiments.

FIG. 3 is a representation of a method, according to embodiments. In some embodiments, the method 300 shown in FIG. 3 is performed by the model evaluation system 120 shown in FIGS. 1A-B.

In some embodiments, the method 300 includes: the model evaluation system (e.g., 120 shown in FIGS. 1A-B) accessing model access information (as described herein) (process S310); and for each model specified by the model access information: for each input data set of a protected class population, the model evaluation system (e.g., 120) determining a decomposition for a model output for an evaluation input data set (x) relative to a baseline (as described herein) (process S320). In some embodiments, the baseline is a single input data set. In some embodiments, the baseline is a population of input data sets. In some embodiments, the method 300 includes selecting a baseline population (as described herein). In some embodiments, the method 300 includes constructing a baseline input data set representative of a baseline population (e.g. by selecting feature values that represent average values, or hypothetical values, across a baseline population). In some embodiments, the baseline is generated according to baseline generation criteria. In some embodiments, baseline generation criteria includes selection criteria for selecting input data sets from historical input data sets of the model. In some embodiments, the method 300 includes providing, to an operator device, a graphical user interface constructed to receive user input specifying the baseline generation criteria, and the baseline generation criteria is received via the graphical user interface. Generating the baseline includes: selecting input data sets in accordance with the selection criteria. In some embodiments, selecting the baseline includes generating a baseline input data set from the selected input data sets.

In some embodiments, S310 includes accessing information for generating a gradient by using a gradient interface of the model (single or ensemble model) being evaluated. In some embodiments, determining a decomposition for a model output for an evaluation input data set (x) relative to a baseline includes: using the gradient interface to generate a gradient for the model output, and using the gradient to generate the decomposition. In some embodiments, S320 and S340 are performed for each of a plurality of protected class populations.

In some embodiments, in a case where the model being evaluated is an ensemble model, the method 300 includes: the model evaluation system (e.g., 120) determining a decomposition for an ensemble model output for each input data set of a protected class population (as described herein) by using decompositions determined (at process S320) for the sub-models of the ensemble (process S330).

An average decomposition for the protected class is determined based on the decompositions for the model outputs for the input data sets of the protect class population (process S340) (e.g., for each feature determining an average value, and the average decomposition being a linear combination of the average values determined for each feature). In the case of a non-ensembled model, process S340 functions to determine the average decomposition for the protected class based on the decompositions for the model outputs (determined at the process S320) for the input data sets of the protect class population. In the case of an ensemble model, process S340 functions to determine the average decomposition for the protected class based on the decompositions for the ensemble outputs (determined at the process S330) for the input data sets of the protect class population. The average decomposition for the protected class population is a decomposition relative to the selected baseline (population or single input data set). Accordingly, feature contribution values reflect differences in feature impact in the protected class population as compared to the baseline population. In some embodiments, the method 300 includes identifying features having values above a threshold in the average decomposition for the protected class population. In some embodiments, the method 300 includes providing the identified features to an operator device (e.g., 171) via a network. In some embodiments, the method 300 includes including the identified features in a graphical user interface and providing the user interface to an operator device for display at the operator device (e.g., 171). In other embodiments, the method 300 includes including natural language explanations generated based on the decomposition described above in a graphical user interface and providing the user interface to an operator device for display at the operator device (e.g., 171).

In some embodiments, the method 300 includes defining a comparison population of input data sets, such as a population of input data sets that do not correspond to a protected class, or a population of input data sets that correspond to a different protected class, and determining an average decomposition for the comparison population as described herein for processes S310-S340. In some embodiments, the method 300 includes process S350, which functions to determine a decomposition for each input data set of the comparison population, by performing a process similar to the process S320. In some embodiments, the method 300 includes the process S360. S360 includes: in a case where the model being evaluated is an ensemble model, the model evaluation system (e.g., 120) determining a decomposition for an ensemble model output for each input data set of the comparison population (as described herein) by using decompositions determined (at process S350) for the sub-models of the ensemble by performing a process similar to the process S330. In some embodiments, an average decomposition for the comparison population is determined based on the decompositions for the model outputs for the input data sets of the comparison population (process S370) (e.g., for each feature determining an average value, and the average decomposition being a linear combination of the average values determined for each feature), by performing a process similar to the process S340.

In some embodiments, a decomposition difference between the average decomposition for the protected class and the average decomposition for a comparison population is determined and used to determine factors of variation in model treatment between the two populations (the protected class population and the comparison population) (process S380). In some embodiments, the method 300 includes providing information to an operator device (process S390). In some embodiments, providing information to an operator device includes: identifying features having values above a threshold in the determined decomposition difference. In some embodiments, providing information to an operator device includes: providing the identified features of the decomposition difference to the operator device (e.g., 171) via a network. In some embodiments, providing information to an operator device includes: including the identified features of the decomposition difference in a graphical user interface and providing the user interface to an operator device for display at the operator device (e.g., 171). In some embodiments, providing information to an operator device includes: including natural language explanations generated based on the of the decomposition difference described above in a graphical user interface and providing the user interface to an operator device for display at the operator device (e.g., 171).

As an example, a baseline can be a baseline population of input data sets across all credit applicants, the protected class population can correspond to credit applications of female applicants and the comparison population can correspond to credit application of male applicants. As an example, a baseline can be a baseline population of input data sets across all credit applicants having a barely acceptable credit application (as described herein), the protected class population can correspond to credit applications of female applicants and the comparison population can correspond to credit application of male applicants.

In some embodiments the method 300 includes displaying the identified features and their decomposition in a graphical user interface. An exemplary graphical user interface that includes features and their decomposition is shown in FIG. 6.

In some embodiments, the method 300 includes determining whether an identified feature is a permissible feature for generating an output (score) for the protected class, and providing information identifying each impermissible feature that is identified to an operator device (e.g., 171). In some embodiments, identified features are presented to an operator for further review before the identified feature is determined to be a permissible feature for generating an output for the protected class. In other embodiments, identified features are automatically determined based on the impact to protected class approvals and the business impact of including the variable. In some embodiments an identified feature is determined permissible based on leaving the feature out, retraining the model, and determining its impact on the approval rate for a protected class. In other embodiments the determination is based on an approval rate difference threshold or other tunable parameters. In some embodiments, the method 300 includes displaying partial dependence plots for identified variables, heat maps, and other visualizations on a display device of an operator device (e.g., 171).

In some embodiments, the method 300 includes identifying features for removal from the model based on the average feature contribution values included in the average decomposition generated at S340. In some embodiments, impermissible features having average feature contribution values above a threshold are identified for removal. In some embodiments, impermissible features having average feature contribution values below a threshold are identified for removal. In some embodiments, feature removal criteria is specified (e.g., specified by stored configuration, received user input, etc.), and a feature is identified for removal based on a comparison between the feature removal criteria and the feature's average feature contribution value.

In some embodiments, updated training data is generated by automatically removing features (identified for removal) from stored training data, and re-training the model on the updated training data.

In some embodiments, the model evaluation system provides an operator device with a graphical user interface that indicates for at least one evaluated protected class population: how the model behaves for input data sets of members of the protected class population as compared with input data sets representative of the baseline population.

In some embodiments, the model evaluation system provides an operator device with a graphical user interface that includes for at least one evaluated protected class population: the average feature contribution values for the input data sets of the protected class population, information identifying a feature corresponding to each average feature contribution value, an explanation for each identified feature, and information identifying the protected class population.

In some embodiments, the process S310 is similar to the process S210 shown in FIG. 2.

In some embodiments, the model access information includes information for accessing input data sets for the baseline population. In some embodiments, the model access information includes information for accessing input data sets for a baseline population, and information for accessing input data sets for at least one protected class population.

In some embodiments, the method 300 includes: the model evaluation system 120 accessing each input data set of a protected class population from the modeling system 110. In some embodiments, the method 300 includes: the model evaluation system 120 accessing each input data set of a protected class population from a storage device (e.g., 181 shown in FIGS. 1A-B). In some embodiments, the method 300 includes: the model evaluation system accessing each input data set of a protected class population and the corresponding sub-model output for each sub-model from the modeling system 110. In some embodiments, the method 300 includes: for each sub-model of the modeling system 110, the model evaluation system accessing a sub-model output for each input data set of a protected class population. In some embodiments, the method 300 includes: the model evaluation system accessing each input data set of a protected class population, and generating the corresponding sub-model output for each sub-model by accessing the modeling system. In some embodiments, the method 300 includes: for each sub-model of the modeling system 110, the model evaluation system generating a sub-model output for each input data set of a protected class population set by accessing the modeling system.

Data

In some embodiments, a decomposition is associated with a model within a knowledge graph which contains nodes, attributes, and labeled edges describing the model variables, the model, a machine-readable representation of the model's computational graph, modeling methods used, training and test data, attributes of training and test data including date ranges and provenance, feature engineering methods, test descriptions including results, hyperparameters, AUC charts, hold out sets, swap-set analysis, economic impact analysis, approval rate analysis, loss projection analysis, ensembling method, data source and provenance, data ranges, a machine-readable description of feature engineering methods, partial dependence plots, or decompositions. In some embodiments model metadata includes a mapping between decompositions and adverse action reason codes. In some embodiments the adverse action mapping is a computable function based on a decomposition. In some embodiments model metadata is stored on a filesystem in a suitable format such as YAML or feather, or in database.

In some embodiments modeling tools are provided to an operator to perform decompositions. In some embodiments, the model evaluation system 120 provides the operator device with a user interface for selecting a baseline population, and one or more model outputs to be decomposed relative to the baseline population. In some embodiments, the model evaluation system 120 includes one of a command line interface, an API, and a graphical user interface (modelling tools) that functions to collect metadata from the operator that is associated with a decomposition. In some embodiments, the model evaluation system 120 stores each generated decomposition in association with the metadata received from the modeling tools. In some embodiments, this metadata includes the decomposition, the model or ensemble and metadata, including feature descriptions, source variables and provenance, feature distributions over time, training data, statistics, symbols, natural language descriptions and templates, and other metadata, without limitation.

In some embodiments, the model evaluation system 120 stores each decomposition in association with additional information. In some embodiments, this additional information is stored in a knowledge graph that is accessible to the operator device via one of a command line interface, a graphical user interface and an API provided by the model evaluation system 120. In some embodiments, the model evaluation system 120 stores each decomposition in association with information identifying the baseline population used for the decomposition. In some embodiments, the model evaluation system 120 stores each decomposition in association with information identifying the model output and the input data set related to the decomposition. In some embodiments, the model evaluation system 120 stores each decomposition in association with information identifying selection criteria used to select the input data sets of the baseline population used for the decomposition. In some embodiments, the model evaluation system 120 stores each decomposition in association with information identifying features used by the version of the model associated with the decomposition. In some embodiments, the model evaluation system 120 stores each decomposition in association with model explanation information generated by using the decomposition. In some embodiments, the model evaluation system 120 stores each decomposition in association with Adverse Action information generated by using the decomposition. In some embodiments, the model evaluation system 120 stores each decomposition in association with information identifying features that have a likelihood of causing the model to disparately impact a member of a protected class. In some embodiments, the model evaluation system 120 stores each decomposition in association with information identifying features selected for removal from model training data based on the decomposition. In some embodiments, the model evaluation system 120 stores each decomposition in association with information identifying model accuracy of a model retrained with training data that excludes one or more features identified for removal based on the decomposition. In some embodiments, for an ensemble model, the model evaluation system 120 stores each ensemble model result decomposition in association with each decomposition determined for a sub-model of the ensemble. In some embodiments, for an ensemble model, the model evaluation system 120 stores each ensemble model result decomposition in association with information indicating the ensembling function of the ensemble. In some embodiments, for an ensemble model, the model evaluation system 120 stores each ensemble model result decomposition in association with information identifying each differentiable sub-model. In some embodiments, for an ensemble model, the model evaluation system 120 stores each ensemble model result decomposition in association with information identifying each non-differentiable sub-model. In some embodiments, for an ensemble model, the model evaluation system 120 stores each ensemble model result decomposition in association with information identifying each tree sub-model. In some embodiments, the model evaluation system 120 stores each decomposition in association with information describing the decomposition process used to generate the decomposition.

In some embodiments model metadata based on decompositions is used to automatically generate model risk management artifacts and documentation. In some embodiments, the model evaluation system 120 uses information stored in the knowledge graph for a model to automatically generate model risk management artifacts and documentation. In some embodiments this documentation allows companies to comply with OCC Bulleten 2011-12, Supervisory Guidance on Model Risk Management. In some embodiments the model risk management documentation includes decompostions of models over time, and at decision points in the modeling process. In other embodiments the model risk management documentation includes disparate impact analysis described herein. In other embodiments machine learning model risk management documentation includes decompositions of models under missing data conditions.

In some embodiments model metadata based on decompositions is used by the model evaluation system 120 to automatically generate model risk management documentation in relation to the ongoing health of models operating in production. In some embodiments the monitoring method includes the model evaluation system 120 first computing the distribution of decompositions of a model's score in batch, live testing, or production within a given timeframe in the past, and comparing the past distributions with the distribution of decompositions of a model's score with a more recent timeframe. In some embodiments the comparing step includes computing a PSI score or other suitable statistic. In other embodiments the comparing step includes computing influence functions.

In some embodiments decompositions and model metadata are used by a user interface (e.g., command line, API, graphical user interface) to provide a workflow to prepare adverse action mappings and to generate adverse action notices based on model outputs, in batch and at decision-time.

6. PERMUTATION IMPORTANCE

"Permutation importance" refers to black-box interpretability methods that only require access to a model's input and corresponding scores. In some embodiments of permutation importance methods: for each feature, the feature is marked as missing, and that feature is assigned an importance equal to the absolute value of the score difference; for each feature, the feature is replaced with its value in other observations, and the feature is assigned an importance equal to the average of the absolute value of the differences; for each feature, the feature is replaced with its value in other observations, and that feature is assigned an importance equal to the variance of the score distribution.

When using permutation importance methods, "importance" of all features might not have a theoretical relation to the model's actual score. This can cause odd scenarios. For example, it is possible that the "importance" of every feature could be 0 and a model's output 1. It is also possible that the "importance" of every feature could be 1 and the model's output 1.

In a case where features are adjusted independently, it might be difficult to understand synergies, redundancies or interactions between features, which could result in degenerate scenarios, as described above.

In some cases, permutation of individual features might create hypothetical observations that might be unrealistic. A model might not perform well when given unrealistic data, yet the method conceptually relies on the model's relationship between data and the score being reasonable and consistent.

In some cases, permutation importance methods are computationally expensive, requiring at least one additional model invocation per feature.

Permutation Importance gives an "Importance" score but doesn't tell you the signed effect of a feature. For example, a variable such as bankruptcies should make a credit score worse if an applicant has more of them, whereas a feature like income should make a credit score better if you have more of it. The direction is needed for generating explanations that power adverse action notices which allow machine learning models to comply with the Fair Credit Reporting Act. The present disclosure provides useful systems and methods that traverse this issue.

7. PROPERTIES OF DECOMPOSITION

Decomposition methods described herein have the following two properties: (1) the feature scores sum to the model's output; and (2) decomposition might be fast to compute.

If two decompositions are differenced, then the L1-norm of the resulting vector will equal the score difference; this property is useful for applications like Adverse Action explainability (as described herein), because it means that if an applicant scores below a threshold, then the applicant will compare poorly to the Adverse Action population. However, if two applicants have the same score, they might have different decompositions. For example, Applicant A might receive 5 points for income and 0 points for debt, while Applicant B receives 7 points for income and −2 points for debt; the applicants have the same score, but the reasons for the score are distinct.

In some embodiments the decompositions are grouped by protected class to show which variables contribute the most to denied applicants from each protected class. In other embodiments an applicant's score is decomposed at decision-time and the decomposition is mapped to adverse action reasons, which are used to generate natural language adverse action notices. In some embodiments adverse action notices are machine generated and mailed to the applicant automatically. In other embodiments the adverse action notices are provided to the applicant via an operator device, such as a web browser, smartphone, a point-of-sale device, or an automatic teller machine.

8. SYSTEM ARCHITECTURE

Figure 4:
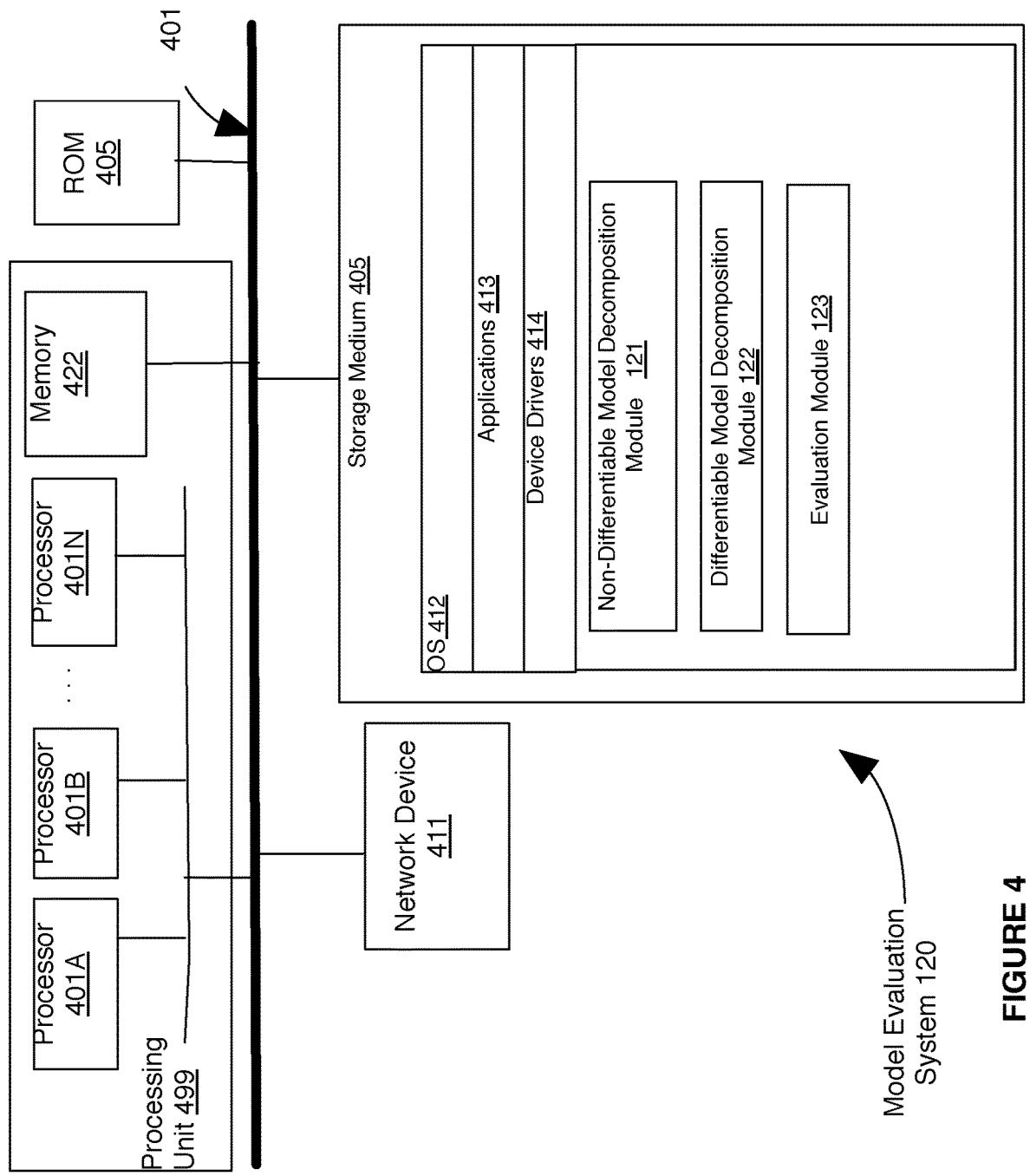
FIG. 4 is a diagram depicting system architecture of a model evaluation system, according to embodiments.

FIG. 4 is a diagram depicting system architecture of a model evaluation system, according to embodiments.

In some embodiments, the system shown in FIG. 4 is implemented as a single hardware server device. In some embodiments, the system shown in FIG. 4 is implemented as a plurality of hardware devices.

In some embodiments, the bus 401 interfaces with the processors 401a-401n, the main memory 422 (e.g., a random access memory (RAM)), a read only memory (ROM) 405, a processor-readable storage medium 405, and a network device 411. In some embodiments, the system includes at least one of a display device and a user input device.

In some embodiments, the processors include one or more of an ARM processor, an X86 processor, a GPU (Graphics Processing Unit), and the like. In some embodiments, at least one of the processors includes at least one arithmetic logic unit (ALU) that supports a SIMD (Single Instruction Multiple Data) system that provides native support for multiply and accumulate operations.

In some embodiments, at least one of a central processing unit (processor), a GPU, and a multi-processor unit (MPU) is included.

In some embodiments, the processors and the main memory form a processing unit 499. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel Xeon processor. In other embodiments, the processing unit includes a Graphical Processing Unit such as NVIDIA Tesla.

The network adapter device provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium includes machine-executable instructions (and related data) for an operating system 412, software programs 413, device drivers 414, the non-differentiable model decomposition module 121, the differentiable model decomposition module 122, and the evaluation module 123.

9. MACHINES

The systems and methods of some embodiments and embodiments thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

10. CONCLUSION

As a person skilled in the art will recognize from the previous detailed description and from the figures and claims, modifications and changes can be made to the embodiments disclosed herein without departing from the scope defined in the claims.

What is claimed is:

1. A method comprising:
receiving an observation input data set of an ensemble model and a corresponding ensemble model output, continuous model output, and tree model output, the observation input data set being associated with a rejection;
generating a first decomposition for the continuous model output relative to a baseline population by using a gradient interface of the continuous model and a second decomposition for the tree model output relative to the baseline population by using tree structure information for the tree model;
generating a third decomposition for the ensemble model output relative to the baseline population by combining the first and second decompositions in accordance with an ensemble process identified by ensemble information for the ensemble model, wherein the first and second decompositions are generated using one or more baseline input data sets representative of the baseline population;
selecting rejection explanation information for the observation input data set based on the third decomposition; and
providing the selected rejection explanation information to an operator device.

2. The method of claim 1, further comprising, with a model evaluation system that is communicatively coupled, via a network, to a modeling system that includes the ensemble model, the gradient interface, the tree structure information, and the ensemble information:
providing a rejection explanation notification to the operator device, the rejection explanation notification comprising the rejection explanation information; and
generating the baseline population by selecting, according to baseline selection criteria, historic input data sets of the ensemble model from training data stored at the modeling system.

3. The method of claim 2, wherein the third decomposition includes a feature contribution value for each feature of the observation input data set, each feature contribution value indicating a contribution of the respective feature to the ensemble model output and the method further comprises:
comparing each feature contribution value of the third decomposition to an importance threshold;
selecting one or more features having a feature contribution value above the importance threshold; and
selecting the rejection explanation information based on the selected one or more features, wherein one or more human-readable textual explanations are stored in association with matching criteria, a textual explanation whose matching criteria are satisfied by the selected one or more features is accessed and included in the rejection explanation information, each of the human-readable textual explanations includes one or more natural language statements with included variables that refer to model features and values, and the variables are replaced with model features and values identified by the third decomposition.

4. The method of claim 3, further comprising:
generating a baseline input data set from input data sets of the baseline population; and
for each feature of the observation input data set, generating a path integral value by computing a path integral of a gradient of the continuous model for the feature along a line path from the baseline input data set to the observation input data set by using the gradient interface, wherein the first decomposition includes the generated path integral values for the features of the observation input data set, each path integral value indicating a contribution of the corresponding feature to the continuous model output.

5. A system comprising:
memory storing textual information, a continuous model, a tree model, an ensemble model, and instructions; and
at least one processor coupled to the memory and configured to execute the stored instructions to:
generate a first decomposition for one or more continuous model outputs relative to a baseline population by using a gradient interface of the continuous model, a second decomposition for one or more tree model outputs relative to the baseline population by using tree structure information for the tree model, and a third decomposition for one or more ensemble model outputs relative to the baseline population by combining the first and second decompositions in accordance with ensemble information for the ensemble model, wherein the first and second decompositions are generated using one or more baseline input data sets representative of the baseline population;
generate explanation information from the third decomposition using the textual information; and
access from a modeling system: the gradient interface, the tree structure information, the ensemble information, input data sets of the baseline population, the continuous model outputs for each of the input data sets, the tree model outputs for each of the input data sets.

6. The system of claim 5, wherein the modeling system is a credit scoring system, each of the input data sets represents a credit application, and the explanation information is used to generate an adverse action letter.

7. The system of claim 6, wherein the processor is further configured to execute the stored instructions to generate the adverse action letter by using the explanation information, and transmit the adverse action letter to a computing device of a credit applicant corresponding to one of the ensemble model outputs via a communication interface.

8. The system of claim 7, wherein the processor is further configured to execute the stored instructions to generate the adverse action letter in real-time with respect to generation of the ensemble model outputs and transmit the adverse action letter to the computing device in real-time with respect to generation of the ensemble model outputs.

9. The system of claim 5, wherein the processor is further configured to execute the stored instructions to use at least one of the continuous model or the tree model to generate a vehicle output from vehicle sensor data, wherein the vehicle output is one of a vehicle control outputs, or an alert output, each of the input data sets represents the vehicle sensor data, and the explanation information indicates one or more reasons for generation of the vehicle output.

10. The method of claim 1, wherein the baseline population is selected from a set of historical input data sets, based on at least one of: race and ethnicity data of the historical input data sets, gender data of the historical input data sets, age data of the historical input data sets, military status data of the historical input data sets, demographic attribute data of the historical input data sets, a function of the data of the historical input data sets, one or more of user-selected selection criteria and predetermined selection criteria, an analysis of the third decomposition, a machine learning model, or a random sampling of the historical input data sets.

11. The method of claim 1, wherein the baseline population is one of: a set of approved applicants, a set of approved applicants within a threshold of an approval cut-off threshold, a set of the input data sets selected based on predetermined attributes, a set of the input data sets selected based on a model decomposition, a set of the input data sets selected based on a machine learning model, a set of the input data sets selected based on a machine learning model and a model decomposition, or a set of the input data sets selected based on a machine learning model, a model decomposition, and meta-data, the meta-data comprising: metadata generated during a model build process, and selection criteria based on the distribution of inputs and a target outcome.

12. The method of claim 1, wherein the:
rejection explanation information includes adverse action reason codes that are computed based on a comparison of the third decomposition for the ensemble model, and a predetermined dataset,
the predetermined dataset includes:
at least one of input values, scores or adverse action reason codes, and
a set of functions to calculate the adverse action reason codes based on the ensemble model output, the third decomposition, and each variable value of the observation input data set,
set of functions includes a pre-determined mapping function, and
mapping function is computed based on a machine learning model.

13. The method of claim 1, further comprising:
for each input data set of the baseline population, determining a first tree model decomposition by using the tree structure information for the tree model;
determining an average baseline decomposition from the tree model decompositions determined for the input data sets of the baseline population;
determining a second tree model decomposition for the observation input data set by using the tree structure information for the tree model; and
determining a difference between the second tree model decomposition for the observation input data set and the average baseline decomposition, the difference being the second decomposition.

14. A non-transitory computer readable medium having stored thereon instructions comprising executable code that, when executed by one or more processors, causes the one or more processors to:
generate a first decomposition for a continuous model output relative to a baseline population, a second decomposition for a tree model output relative to the baseline population by using tree structure information for a tree model, and a third decomposition for an ensemble model output relative to the baseline population by combining the first and second decompositions, wherein the first and second decompositions are generated using one or more baseline input data sets representative of the baseline population;
select rejection explanation information for an observation input data set of the ensemble model based on the third decomposition, wherein the observation input data set being associated with a rejection; and
output the rejection explanation information.

15. The non-transitory computer readable medium of claim 14, wherein the executable code, when executed by one or more processors, further causes the one or more processors to select the rejection explanation information in accordance with an ensemble process identified by ensemble information for the ensemble model.

16. The non-transitory computer readable medium of claim 14, wherein the executable code, when executed by one or more processors, further causes the one or more processors to:
provide a rejection explanation notification to the operator device, the rejection explanation notification comprising the rejection explanation information; and
generate the baseline population by selecting, according to baseline selection criteria, historic input data sets of the ensemble model from training data stored at a modeling system hosting the ensemble model.

17. The non-transitory computer readable medium of claim 16, wherein the third decomposition includes a feature contribution value for each feature of the observation input data set, each feature contribution value indicating a contribution of the respective feature to the ensemble model output and the executable code, when executed by one or more processors, further causes the one or more processors to:
compare each feature contribution value of the third decomposition to an importance threshold;
select one or more features having a feature contribution value above the importance threshold; and
select the rejection explanation information based on the selected one or more features, wherein one or more human-readable textual explanations are stored in association with matching criteria, a textual explanation whose matching criteria are satisfied by the selected one or more features is accessed and included in the rejection explanation information, each of the human-readable textual explanations includes one or more natural language statements with included variables that refer to model features and values, and the variables are replaced with model features and values identified by the third decomposition.

18. The non-transitory computer readable medium of claim 17, wherein the executable code, when executed by one or more processors, further causes the one or more processors to:
generate a baseline input data set from input data sets of the baseline population; and
for each feature of the observation input data set, generate a path integral value by computing a path integral of a gradient of the continuous model for the feature along a line path from the baseline input data set to the observation input data set by using the gradient interface, wherein the first decomposition includes the generated path integral values for the features of the observation input data set, each path integral value indicating a contribution of the corresponding feature to the continuous model output.

19. The non-transitory computer readable medium of claim 14, wherein the:
rejection explanation information includes adverse action reason codes that are computed based on a comparison of the third decomposition and a predetermined dataset,
the predetermined dataset includes:
at least one of input values, scores, or adverse action reason codes, and
a set of functions to calculate the adverse action reason codes based on the ensemble model output, the third decomposition, and each variable value of the observation input data set,
set of functions includes a pre-determined mapping function, and
mapping function is computed based on a machine learning model.

20. The non-transitory computer readable medium of claim 14, wherein the executable code, when executed by one or more processors, further causes the one or more processors to:
for each input data set of the baseline population, determine a first tree model decomposition by using the tree structure information for the tree model;
determine an average baseline decomposition from the tree model decompositions determined for the input data sets of the baseline population;
determine a second tree model decomposition for the observation input data set by using the tree structure information for the tree model; and
determine a difference between the second tree model decomposition for the observation input data set and the average baseline decomposition, the difference being the second decomposition.

21. The non-transitory computer readable medium of claim 14, wherein the tree model output is associated with a non-differentiable model and the continuous model output is associated with a differentiable model.

* * * * *